(12) United States Patent
Fukushima et al.

(10) Patent No.: US 12,174,690 B2
(45) Date of Patent: Dec. 24, 2024

(54) INFORMATION PROCESSING DEVICE, METHOD, PRODUCT, AND SYSTEM FOR CALCULATION OF RELIABILITY OF ESTIMATION VALUE OF NUMBER OF PRESENT OBJECTS WITH HIGH ACCURACY

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Arika Fukushima, Kawasaki Kanagawa (JP); Takufumi Yoshida, Funabashi Chiba (JP); Koichi Kondo, Kawasaki Kanagawa (JP); Shuuichiro Imahara, Kawasaki Kanagawa (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 93 days.

(21) Appl. No.: 17/822,920

(22) Filed: Aug. 29, 2022

(65) Prior Publication Data

US 2023/0297455 A1 Sep. 21, 2023

(30) Foreign Application Priority Data

Mar. 18, 2022 (JP) .................................. 2022-044222

(51) Int. Cl.
  *G06F 11/07* (2006.01)
(52) U.S. Cl.
  CPC ...... *G06F 11/0751* (2013.01); *G06F 11/0721* (2013.01)

(58) Field of Classification Search
  CPC .......................... G06F 11/0751; G06F 11/0721
  See application file for complete search history.

(56) References Cited

U.S. PATENT DOCUMENTS 6,073,089 A * 6/2000 Baker ................. G06F 11/0709
  73/114.61
11,928,591 B2 * 3/2024 Esaki ................. G06F 18/2415
(Continued)

FOREIGN PATENT DOCUMENTS

EP  4011569 A1 * 6/2022  .............. B25J 11/00
JP  4908541 B2    4/2012
(Continued)

OTHER PUBLICATIONS

Sean Meyn et al., "A Sensor-Utility-Network Method for Estimation of Occupancy in Buildings," Proc. of the 48h IEEE Conf. on Decision and Control (CDC), pp. 1494-1500, XP031620178 (2009).

*Primary Examiner* — Matthew M Kim
*Assistant Examiner* — Indranil Chowdhury
(74) *Attorney, Agent, or Firm* — Finnegan, Henderson, Farabow, Garrett & Dunner, LLP

(57) ABSTRACT

An information processing device is disclosed. In the information processing device, a derivation unit derives, for each of sensors, a constraint expression obtained by substituting an observation value for a term of an observation value variable in an error model. The observation value indicates the number of present objects observed by the sensors. The error model represents correspondence between: the number of present objects in an observation range represented by the observation value variable and an error term related to an assumed detection error range of the sensor, and the number of present objects in an observation range represented by a variable indicating the number of present objects in an observation unit space. A range calculation unit calculates a possible range of the number of present objects. A reliability (Continued)

calculation unit calculates reliability of an estimation value of the number of present objects for each of the areas.

18 Claims, 28 Drawing Sheets

(56) References Cited

U.S. PATENT DOCUMENTS

| | | | | |
|---|---|---|---|---|
| 2012/0331024 | A1* | 12/2012 | Aoki | G01S 19/396 |
| | | | | 708/200 |
| 2014/0236871 | A1* | 8/2014 | Fujimaki | G06N 20/00 |
| | | | | 706/12 |
| 2016/0369777 | A1* | 12/2016 | Chiang | G05B 23/024 |
| 2018/0082204 | A1 | 3/2018 | Iwamasa et al. | |
| 2018/0316517 | A1* | 11/2018 | Henzig | G06F 11/3409 |
| 2019/0332638 | A1* | 10/2019 | Inakoshi | G06F 16/9538 |
| 2021/0303381 | A1* | 9/2021 | Baldassarre | G06N 5/04 |
| 2022/0318340 | A1* | 10/2022 | Krug | G01D 21/00 |
| 2023/0161929 | A1* | 5/2023 | Kodama | F24F 11/62 |
| | | | | 703/6 |
| 2023/0288527 | A1* | 9/2023 | Chishima | G01S 5/16 |
| 2024/0048127 | A1* | 2/2024 | Akatsuka | H03H 17/0257 |
| 2024/0219873 | A1* | 7/2024 | Mariyama | F24F 11/64 |

FOREIGN PATENT DOCUMENTS

| | | | | |
|---|---|---|---|---|
| JP | 5002733 | B2 | 8/2012 | |
| JP | 2019-12494 | A | 1/2019 | |
| JP | 6562883 | B2 | 8/2019 | |
| JP | 2021-9728 | A | 1/2021 | |
| WO | WO-2007033939 | A1 * | 3/2007 | ............ B61L 25/021 |
| WO | WO-2022091578 | A1 * | 5/2022 | ............ B25J 19/021 |

\* cited by examiner

OBSERVATION VALUE FILE 40

| SENSOR ID | DATE AND TIME | OBSERVATION VALUE |
|---|---|---|
| Sji | 2021/12/21 10:30 | 31 |

FIG.5A

VARIABLE DEFINITION TABLE 32A (32)

| VARIABLE NAME | LOWER BOUND | UPPER BOUND |
|---|---|---|
| X1 | 0 | NA |
| X2 | 0 | NA |
| X3 | 0 | NA |
| X4 | 0 | NA |
| X5 | 0 | NA |
| X6 | 0 | NA |
| X7 | 0 | NA |
| X8 | 0 | NA |

FIG.5B

AREA DEFINITION TABLE 32B (32)

| AREA ID | CONFIGURATION | LOWER BOUND | UPPER BOUND |
|---|---|---|---|
| EA1 | X1 | 0 | 50 |
| EA2 | X2+X3 | 0 | 50 |
| EA3 | X4+X5 | 0 | 50 |
| EA4 | X6+X7+X8 | 0 | NA |

FIG.5C

ERROR TERM DEFINITION TABLE 32C (32)

| ERROR TERM NAME | SENSOR ID | LOWER BOUND | UPPER BOUND |
|---|---|---|---|
| eps11 | S11 | -5 | 5 |
| eps12 | S12 | -10 | 9 |
| eps13 | S13 | NA | NA |
| eps21 | S21 | -3 | NA |
| eps22 | S22 | NA | 2 |

FIG.5D

ERROR MODEL DEFINITION TABLE 32D (32)

| SENSOR ID | OBSERVATION VALUE VARIABLE | ERROR MODEL | LOWER BOUND | UPPER BOUND |
|---|---|---|---|---|
| S11 | Y11 | Y11+eps11=X1+X2+X8 | 0 | 60 |
| S12 | Y12 | Y12+eps12=X3+X4 | 0 | 90 |
| S13 | Y13 | Y13+eps13=X5+X6+X7 | 0 | 30 |
| S21 | Y21 | Y21+eps21=X6 | 0 | NA |
| S22 | Y22 | Y22+eps22=X7+X8 | 0 | NA |

RANGE DEFINITION DB 34

| AREA ID | ENDPOINT DEFINITION ||
|---|---|---|
| | DEFINITION OF MINIMUM ENDPOINT | DEFINITION OF MAXIMUM ENDPOINT |
| EA1 | MINIMUM VALUE | MAXIMUM VALUE |
| EA2 | MINIMUM VALUE − 1 | MAXIMUM VALUE |
| EA3 | MINIMUM VALUE − 2 | MAXIMUM VALUE + 2 |
| EA4 | MINIMUM VALUE × 0.8 | MAXIMUM VALUE × 1.5 |

FIG.8

RELIABILITY FILE 44

| AREA ID | MINIMUM ENDPOINT | MAXIMUM ENDPOINT | RELIABILITY |
|---------|------------------|------------------|-------------|
| EA1     | 10               | 22               | 0.08        |
| EA2     | 5                | 14               | 0.10        |
| EA3     | 9                | 20               | 0.08        |
| EA4     | 15               | 19               | 0.20        |

FIG.9

ESTIMATION VALUE FILE 46

| AREA ID | ESTIMATION VALUE |
|---------|------------------|
| EA1     |                  |
| EA2     |                  |
| EA3     |                  |
| EA4     |                  |

FIG.15A 36A
(36)

GROUP DEFINITION LIST GROUP

GROUP 1≠[S11, S12, S13]
GROUP 2≠[S21, S22]

↑
GROUP ID

FIG.15B

WEIGHT
DEFINITION TABLE 36B
(36)

| | GROUP 1 | GROUP 2 |
|---|---|---|
| K COMBINATIONS | 1 | 1 |
| | 1 | 5 |
| | ⋮ | ⋮ |

FIG.16

SIMULATION TABLE                              38

| AREA ID | SIMULATION 1 | SIMULATION 2 | ... | SIMULATION K |
|---------|--------------|--------------|-----|--------------|
| EA1     | 13           | 18           | ... | 21           |
| EA2     | 10           | 15           | ... | 14           |
| EA3     | 21           | 13           | ... | 17           |
| ...     | ...          | ...          | ... | ...          |

FIG.19A

AREA DEFINITION TABLE 33B (33)

| AREA ID | CONFIGURATION | LOWER BOUND | UPPER BOUND |
|---|---|---|---|
| EA1 | A1 | 0 | 50 |
| EA2 | A2 | 0 | 50 |
| EA3 | A3 | 0 | 50 |
| EA4 | A4 | 0 | NA |

FIG.19B

ERROR TERM DEFINITION TABLE 33C (33)

| ERROR TERM NAME | SENSOR ID | LOWER BOUND | UPPER BOUND |
|---|---|---|---|
| eps11 | S11 | -5 | 5 |
| eps12 | S12 | -10 | 9 |
| eps13 | S13 | NA | NA |
| eps21 | S21 | -3 | NA |
| eps22 | S22 | NA | 2 |

FIG.19C

ERROR MODEL DEFINITION TABLE 33D
(33)

| SENSOR ID | OBSERVATION VALUE VARIABLE | ERROR MODEL | LOWER BOUND | UPPER BOUND |
|---|---|---|---|---|
| S11 | Y11 | Y11+eps11=A1+0.2*A1+0.2*A8 | 0 | 60 |
| S12 | Y12 | Y12+eps12=0.8*A2+0.9*A3 | 0 | 90 |
| S13 | Y13 | Y13+eps13=0.1*A3+0.8*A4 | 0 | 30 |
| S21 | Y21 | Y21+eps21=0.5*A4 | 0 | NA |
| S22 | Y22 | Y22+eps22=0.5*A4 | 0 | NA |

FIG.25A

VARIABLE DEFINITION TABLE 35A (35)

| VARIABLE NAME | LOWER BOUND | UPPER BOUND | RATIO |
|---|---|---|---|
| X1 | 0 | NA | 100 |
| X2 | 0 | NA | 20 |
| X3 | 0 | NA | 80 |
| X4 | 0 | NA | 80 |
| X5 | 0 | NA | 20 |
| X6 | 0 | NA | 50 |
| X7 | 0 | NA | 40 |
| X8 | 0 | NA | 10 |

FIG.25B

INTEGRATED VARIABLE DEFINITION TABLE 35E (35)

| INTEGRATED VARIABLE NAME | LOWER BOUND | UPPER BOUND | CONFIGURATION VARIABLE |
|---|---|---|---|
| Z1 | 0 | NA | X1, X2 |

FIG.25C

ERROR MODEL DEFINITION TABLE        35D
                                    (35)

| SENSOR ID | OBSERVATION VALUE VARIABLE | ERROR MODEL | LOWER BOUND | UPPER BOUND |
|---|---|---|---|---|
| S11 | Y11 | Y11+eps11=Z1+X8 | 0 | 60 |
| S12 | Y12 | Y12+eps12=X3+X4 | 0 | 90 |
| S13 | Y13 | Y13+eps13=X5+X6+X7 | 0 | 30 |
| S21 | Y21 | Y21+eps21=X6 | 0 | NA |
| S22 | Y22 | Y22+eps22=X7+X8 | 0 | NA |

INFORMATION PROCESSING DEVICE, METHOD, PRODUCT, AND SYSTEM FOR CALCULATION OF RELIABILITY OF ESTIMATION VALUE OF NUMBER OF PRESENT OBJECTS WITH HIGH ACCURACY

CROSS-REFERENCE TO RELATED APPLICATIONS

This application is based upon and claims the benefit of priority from Japanese Patent Application No. 2022-044222, filed on Mar. 18, 2022; the entire contents of which are incorporated herein by reference.

FIELD

Embodiments described herein relate generally to an information processing device, an information processing method, a computer program product, and an information processing system.

BACKGROUND

There is a knowns system for estimating the number of present people in each of one or more areas included in a space inside a building and the like. For example, an estimation value of the number of present people is calculated by using a statistical model and an observation value acquired from a sensor installed in the area. There is a related art that discloses a method of calculating an estimation value of the number of present people and reliability of the estimation value of the number of present people on the assumption that error distribution of the sensor is normal distribution whose average is zero (0).

However, an event different from the assumption may occur in a real environment such that error distribution is not normal distribution, for example. Thus, in the related art, there is a case in which high reliability is derived for the estimation value although the reliability of the estimation value is actually low, and deviation between the estimation value and an actual measured value may be caused. That is, in the related art, it has been difficult to calculate the reliability of the estimation value of the number of present objects such as the number of present people in the area with high accuracy.

BRIEF DESCRIPTION OF THE DRAWINGS

FIG. 5A is a schematic diagram of a data configuration of an error model;

FIG. 5B is a schematic diagram of a data configuration of an error model;

FIG. 5C is a schematic diagram of a data configuration of an error model;

FIG. 5D is a schematic diagram of a data configuration of an error model;

FIG. 8 is a schematic diagram of a data configuration of a reliability file;

FIG. 9 is a schematic diagram of a data configuration of an estimation value file;

FIG. 15A is a schematic diagram of a data configuration of a priority definition DB;

FIG. 15B is a schematic diagram of a data configuration of a priority definition DB;

FIG. 16 is a schematic diagram of a data configuration of a simulation table;

FIG. 19A is a schematic diagram of a data configuration of an error model DB;

FIG. 19B is a schematic diagram of a data configuration of an error model DB;

FIG. 19C is a schematic diagram of a data configuration of an error model DB;

FIG. 25A is a schematic diagram of a data configuration of an error model DB;

FIG. 25B is a schematic diagram of a data configuration of an error model DB;

FIG. 25C is a schematic diagram of a data configuration of an error model DB;

DETAILED DESCRIPTION

Figure 1:
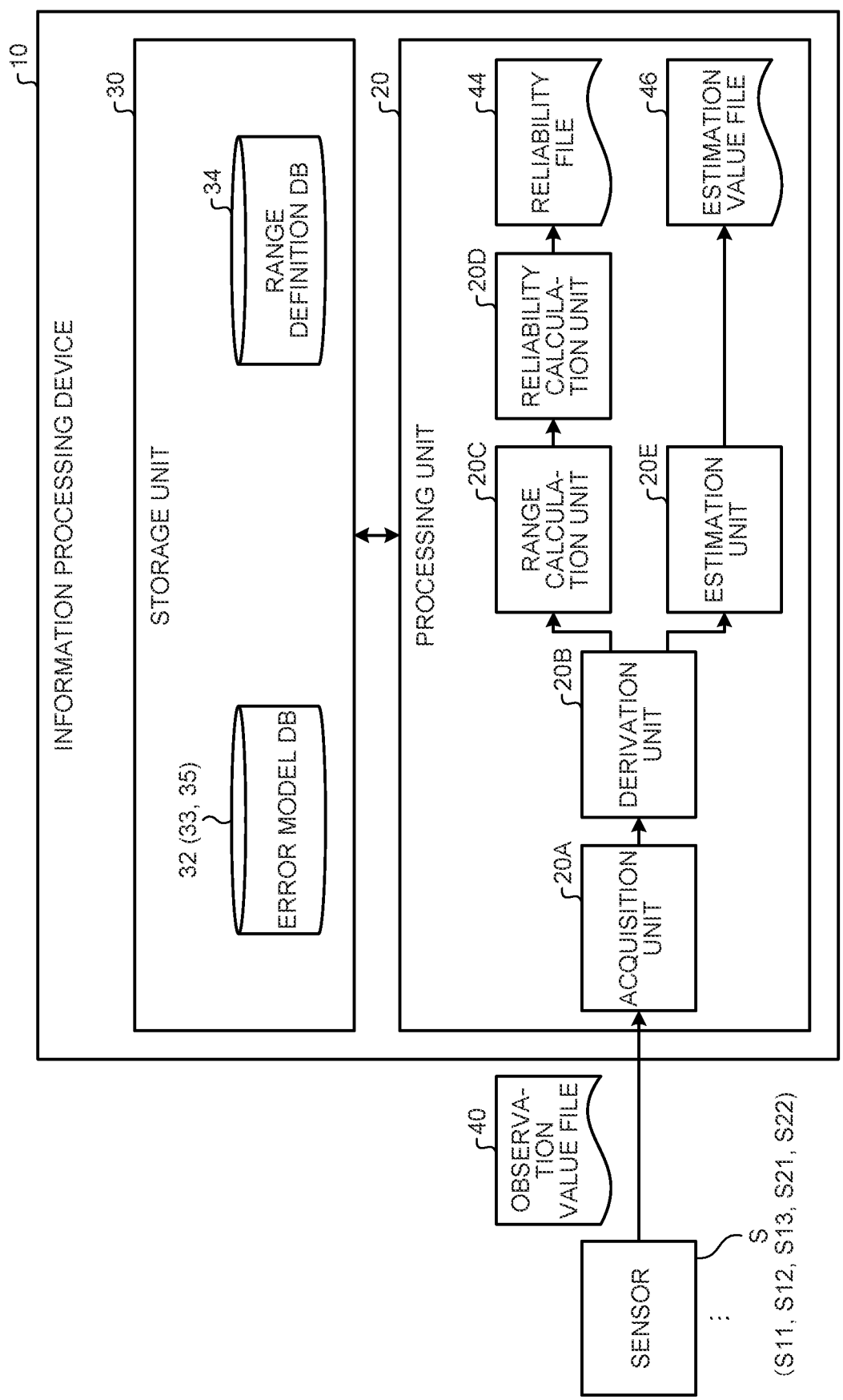
FIG. 1 is a schematic diagram of an information processing system.

An information processing device according to an embodiment includes one or more hardware processors configured to function as a derivation unit, a range calculation unit, and a reliability calculation unit. The derivation unit serves to derive, for each of sensors, a constraint expression obtained by substituting an observation value for a term of an observation value variable included in an error model. The observation value is an observation value of the number of present objects observed by one or more sensors disposed in at least part of one or more areas. The error model represents correspondence between: the number of present objects in an observation range of the sensor represented by the observation value variable of the observation value and an error term related to an assumed detection error range of the sensor, and the number of present objects in an observation range of the sensor represented by a variable indicating the number of present objects in an observation unit space determined on the basis of the observation range of the sensor and a range of the area. The range calculation unit serves to calculate a possible range of the number of present objects in the area by using the constraint expression. The reliability calculation unit serves to calculate, by using the possible range, reliability of an estimation value of the number of present objects for each of the areas.

The following describes an information processing device, an information processing method, a computer program, and an information processing system in detail with reference to the attached drawings.

In the following description of embodiments and modifications, portions denoted by the same reference numeral substantially have the same function, and description about duplicate portions will be appropriately omitted.

First Embodiment

FIG. 1 is a schematic diagram of an example of an information processing system 1 according to the present embodiment.

The information processing system 1 includes a sensor S and an information processing device 10. The information processing device 10 and the sensor S are connected to each other in a communicable manner.

The information processing device 10 is a system for estimating the number of present objects in an area and deriving reliability of an estimation value of the number of present objects on the basis of an observation value obtained by observing the area as an estimation target for the number of present objects. The number of present objects in the area means the number of objects present in the area. An element may be any object whose number can be directly or indirectly detected by the sensor S. The object is, for example, a person, an animal such as a bird or a dog, a plant, a cell, a mobile object such as an automobile, a stationary object that is a non-mobile object, or the like. The present embodiment exemplifies a form in which a prime object is a person, and the number of present objects is the number of present people. The number of present people in an area is the number of people present in the area.

Figure 2:
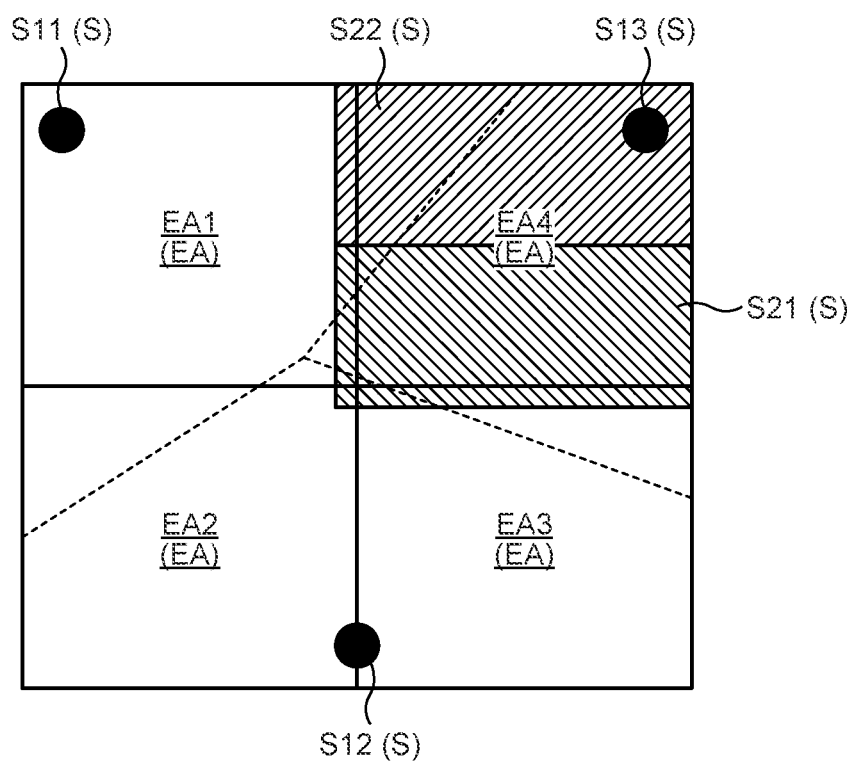
FIG. 2 is an explanatory diagram of an area included in a space as an observation target.

FIG. 2 is an explanatory diagram of an example of areas EA included in a space MS as an observation target. The space MS as the observation target is a space as a target for observing the number of present people. The space MS as the observation target is, for example, a space inside a building, a space inside a room, and the like, but is not limited thereto. The space MS as the observation target is classified into one or more areas EA in advance.

The present embodiment exemplifies a form in which the space MS as the observation target is classified into the n areas EA. n is an integral number equal to or larger than 1. The present embodiment exemplifies a form in which the space MS as the observation target is divided into the areas EA, and n is an integral number equal to or larger than 2. Specifically, the present embodiment exemplifies a form in which n=4. Thus, FIG. 2 exemplifies a form in which the space MS as the observation target is divided into the four areas EA including an area EA1 to an area EA4 to be managed. Hereinafter, in a case of collectively explaining the area EA1 to the area EA4, the area EA1 to the area EA4 may be simply referred to as the areas EA in some cases.

A shape of the area EA may be an optional shape. FIG. 2 exemplifies a form in which the shape of each of the areas EA is a rectangular shape as an example. However, the shape of the area EA may be any shape such as a circular shape, an elliptical shape, or a polygonal shape other than a quadrangular shape. At least some of the shapes of the areas EA in the space MS as the observation target may be different from each other.

One or more sensors S are disposed in at least part of the areas EA.

The sensor S is a sensor for obtaining an observation value of the number of present people within an observation range of the sensor S. Examples of the sensor S include the sensor S that directly or indirectly observes the number of present people. Examples of the sensor S that directly observes the number of present people include a gate sensor, a Wireless Fidelity (WiFi) sensor, and a beacon sensor. Examples of the sensor S that indirectly observes the number of present people include a $CO_2$ concentration sensor, an electric energy sensor, a temperature sensor, and the like each indirectly observing the number of present people using statistics, machine learning, and the like. In a case of using the $CO_2$ concentration sensor as the sensor S, the number of present people can be indirectly observed by considering and estimating an amount of exhalation per person. In a case of using the electric energy sensor as the sensor S, the number of present people can be indirectly observed by considering and estimating a power consumption amount per person. In a case of using the temperature sensor as the sensor S, the number of present people can be indirectly observed by considering and estimating a heat rising amount per person.

Types of the sensors S disposed in the space MS as the observation target may be the same type or different types. The present embodiment exemplifies a form in which j types of and i or more sensors S are disposed in the space MS as the observation target. Herein, j is an integral number equal to or larger than 1, and represents the type of the sensor S. Specifically, the present embodiment describes an example in which j=2, and two types of the sensors S are disposed. i represents the number of sensors S belonging to each of the types. In the present embodiment, the sensors S each represented by Sji are disposed in the space MS as the observation target.

Specifically, FIG. 2 exemplifies a state in which two types of the sensors S are disposed, the two types of sensors S including a sensor S11 to a sensor S13, and sensors S21 to S22 as the sensors S of a type different from that of the sensor S11 to the sensor S13. That is, the present embodiment exemplifies a case of using Sji as identification information for each of the sensors S. Sji means the i-th sensor S belonging to the type represented by j.

The sensor S11 to the sensor S13 represent the three sensors S (i=1 to 3) belonging to the type represented by j=1. A space surrounded by a dashed line in FIG. 2 indicates an observation range of each of the sensor S11 to the sensor S13. The sensor S21 to the sensor S22 represent the two sensors S (i=1 to 2) belonging to the type represented by j=2. A space indicated by hatching in FIG. 2 indicates an observation range of each of the sensor S21 and the sensor S22.

The shape of the space of the observation range of each of the sensors S may be an optional shape, and is not limited to a rectangular shape.

Returning to FIG. 1, the description will be continued. In the present embodiment, the information processing device 10 derives the estimation value of the number of present people in each of the areas EA, and the reliability of the estimation value of the number of present people on the basis of the observation value of the number of present people obtained by each of the sensors S.

The information processing device 10 includes a processing unit 20 and a storage unit 30. The processing unit 20 and the storage unit 30 are connected to each other in a communicable manner via a bus and the like.

The storage unit 30 stores various kinds of data. In the present embodiment, the storage unit 30 stores an error model DB (database) 32 and a range definition DB 34. The error model DB 32 and the range definition DB 34 are stored in the storage unit 30 in advance, and used at the time of processing performed by the processing unit 20 described later. Details about these databases will be described later.

The processing unit 20 performs information processing in the information processing device 10. The processing unit 20 includes an acquisition unit 20A, a derivation unit 20B, a range calculation unit 20C, a reliability calculation unit 20D, and an estimation unit 20E.

The acquisition unit 20A, the derivation unit 20B, the range calculation unit 20C, and the estimation unit 20E may be implemented by one or more processors. For example, each of the units described above may be implemented by causing a processor such as a central processing unit (CPU) to execute a computer program, that is, by software. Each of the units described above may also be implemented by a processor such as a dedicated IC, that is, by hardware. Each of the units described above may also be implemented by using both of software and hardware. In a case of using two or more processors, each of the processors may implement one of the units, or may implement two or more of the units.

Alternatively, at least one of the units described above, or at least part of information stored in the storage unit 30 may be mounted on an external information processing device that is connected to the information processing device 10 in a communicable manner.

The acquisition unit 20A acquires observation values of the number of present people from one or more sensors S disposed in at least part of one or more areas EA. In the present embodiment, the acquisition unit 20A acquires observation values respectively observed by the sensor S11 to the sensor S13 and the sensor S21 to the sensor S22, and outputs an observation value file 40 including these observation values to the derivation unit 20B.

Figures 3, 4:
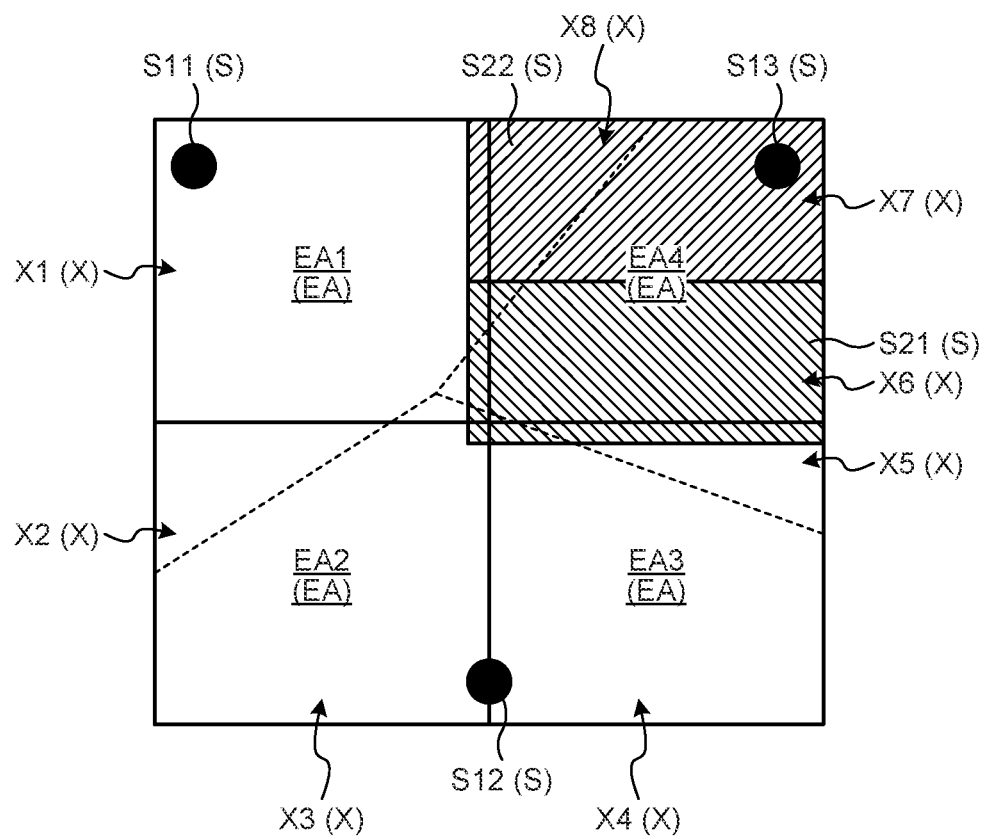
FIG. 3 is an explanatory diagram of a data configuration of an observation value file.
FIG. 4 is an explanatory diagram of observation unit spaces and variables.

FIG. 3 is an explanatory diagram of an example of a data configuration of the observation value file 40. The observation value file 40 is a file in which a sensor ID, observation date and time of the observation value, and the observation value are associated with each other. The observation value file 40 is a file in a table format, and written in a Comma-Separated Values (CSV) format, for example. A data format of the observation value file 40 may be an optional data format, and is not limited to the table format.

The sensor ID is identification information for the sensor S. As described above, the present embodiment describes a case of representing the sensor ID as Sji. Sji means the i-th sensor S belonging to the type represented by j.

The date and time represent the observation date and time of the observation value. For example, the date and time are written in a format such as "YYYY/MM/DD hh: mm: ss". YYYY represents the dominical year, MM represents a month, and DD represents a date. hh represents a time, mm represents a minute, and ss represents a second.

The observation value represents the observation value of the number of present people observed by the sensor S that is identified with the sensor ID. The observation value is represented by the number of people, that is, an integral number equal to or larger than 1. In a case in which the observation value is the number of people "0 (zero)", "NA" is used as the observation value.

Returning to FIG. 1, the description will be continued. The acquisition unit 20A outputs the observation value file 40 to the derivation unit 20B. The observation value file may be a file including the observation value of at least one sensor S and at least one date and time.

The derivation unit 20B derives a constraint expression for each of the sensors S.

The constraint expression is an expression representing a constraint condition used at the time of solving a mathematical optimization problem by the range calculation unit 20C (described later). The constraint expression is an expression that is derived by substituting the observation value acquired by the acquisition unit 20A for a term of an observation value variable included in an error model. The error model is a model including the observation value variable of the observation value of the sensor S, and defining a relation between an error term related to an assumed detection error range of the sensor S and a variable X representing the number of present people in the observation unit space. Details about the error model will be described later.

The observation unit space is a space as a minimum unit defined by the observation range of the sensor S and a range of the area EA in the space MS as the observation target. In other words, the observation unit space is each space partitioned by a boundary line representing a boundary of the observation range of the sensor S and a boundary line of the area EA.

FIG. 4 is an explanatory diagram of an example of observation unit spaces and variables X in the space MS as the observation target. To the space MS as the observation target, m variables X are assigned. m is an integral number equal to or larger than 1, and is the number of observation unit spaces included in the space MS as the observation target.

In FIG. 4, a variable X1 to a variable X8 represent the numbers of present people in the respective observation unit spaces that are spaces partitioned by the boundary line representing the boundary of the observation range of the sensor S and the boundary line of the area EA. The variable X1 to the variable X8 are examples of the variables X. Moreover, in FIG. 4, eight observation unit spaces are included in the space MS as the observation target. Thus, eight variables X1 to X8 are illustrated as the variables X included in the space MS as the observation target by way of example.

The number of the observation unit spaces included in the space MS as the observation target is determined on the basis of the observation range of each of the sensors S and the range of the area EA, and is not limited to eight.

The variable X is not necessarily given to the observation unit space having an area in which a person cannot be present among the observation unit spaces included in the space MS as the observation target. As this area, an area smaller than a minimum area required for one person to be present may be determined, for example.

The number of present people in each of the areas EA included in the space MS as the observation target can be represented by a configuration of the variables X of one or more observation unit spaces included in the area EA. For example, in a case of the example illustrated in FIG. 4, a relation between each of the area EA1 to the area EA4 and the variables X is represented by the following expression (1) to expression (4).

$$EA1 = X1 \quad (1)$$

$$EA2 = X2 + X3 \quad (2)$$

$$EA3 = X4 + X5 \quad (3)$$

$$EA4 = X6 + X7 + X8 \quad (4)$$

In the expression (1) to the expression (4), EA1 to EA4 respectively represent the numbers of present people in the area EA1 to the area EA. X1 to X8 respectively represent the variable X1 to the variable X8.

As described above, the number of present people in each of the areas EA included in the space MS as the observation target is represented by the configuration of one or more variables X. Thus, a relation between the observation value obtained by each of the sensors S and the variable X is represented by the following expression (5) to expression (9).

$$Y11 = X1 + X2 + X8 \quad (5)$$

$$Y12 = X3 + X4 \quad (6)$$

$$Y13 = X5 + X6 + X7 \quad (7)$$

$$Y21 = X6 \quad (8)$$

$$Y22 = X7 + X8 \quad (9)$$

In the expressions (5) to (9), Y11 to Y22 are values each represented by $Yji$. i and j are the same as those described above. That is, $Yji$ represents an observation value obtained by the sensor S represented by $Sji$. Specifically, Y11 to Y22 respectively represent observation values obtained by the sensor S11 to the sensor S22.

Returning to FIG. 1, the description will be continued. The derivation unit 20B derives a constraint expression using the observation value file 40 acquired from the acquisition unit 20A and the error model DB 32 defining the variables X and the like.

The error model DB 32 is a database for defining a constraint expression.

FIG. 5A to FIG. 5D are schematic diagrams illustrating examples of a data configuration of the error model DB 32. For example, the error model DB 32 includes a variable definition table 32A, an area definition table 32B, an error term definition table 32C, and an error model definition table 32D.

In each of the tables described above included in the error model DB 32, values of an upper bound representing an upper limit value and a lower bound representing a lower limit value are set in advance. In these tables, at least one of values of the upper bound and the lower bound is not necessarily set. In this case, "NA" may be registered as a value in a field of the upper bound or the lower bound in which the value is not set.

FIG. 5A is a schematic diagram illustrating an example of a data configuration of the variable definition table 32A. The variable definition table 32A is a table specifying the upper bound and the lower bound of the number of present people for each of the variables X included in the space MS as the observation target.

Specifically, the variable definition table 32A is a table in which a variable name, the lower bound, and the upper bound are associated with each other. The variable name is identification information for the variable X included in the space MS as the observation target. FIG. 5A exemplifies X1 to X8 as variable names of the variable X1 to the variable X8, respectively. The lower bound in the variable definition table 32A represents a lower limit value of the number of present people represented by the variable X identified with a corresponding variable name. The upper bound in the variable definition table 32A represents an upper limit value of the number of present people represented by the variable X identified with a corresponding variable name.

As described above, the variable X represents the number of present people in the observation unit space. FIG. 5A exemplifies a case in which "0" is set in advance as the value of the lower bound corresponding to the variable X identified with each of the variable names. However, an integral number equal to or larger than 1 may be set in advance as the value of the lower bound. FIG. 5A exemplifies a case in which "NA" is set in advance, "NA" representing that the value is not set, as the value of the upper bound corresponding to the variable X identified with each of the variable names is not set. However, an integral number equal to or larger than 1 may be set in advance as the value of the upper bound. For example, as the value of the upper bound in the variable definition table 32A, a value obtained by dividing a space area of the observation unit space corresponding to the variable X identified with a corresponding variable name by a required space area for one person may be set in advance.

FIG. 5B is a schematic diagram illustrating an example of a data configuration of the area definition table 32B. The area definition table 32B is a table specifying the configuration of the variables X in the observation unit space included in the area EA, and the lower bound and the upper bound of the number of present people for each of the areas EA included in the space MS as the observation target.

Specifically, the area definition table 32B is a table in which an area ID, the configuration, the lower bound, and the upper bound are associated with each other. The area ID is identification information for the area EA. FIG. 5B illustrates EA1 to EA4 as respective area IDs of the area EA1 to the area EA4 included in the space MS as the observation target. The configuration represents a configuration of the variables X of the observation unit space included in the area EA identified with a corresponding area ID. The configuration of the variables X is represented by a combination of the variable names as pieces of the identification information for the respective variables X. For example, in the area definition table 32B, configurations satisfying respective relations represented by the expression (1) to the expression (4) described above are set in advance while being associated with respective area IDs.

The lower bound and the upper bound in the area definition table 32B respectively represent a lower limit value and an upper limit value of the number of present people who may be present in the area EA identified with a corresponding area ID.

As described above, the variable X represents the number of present people in the observation unit space. FIG. 5B exemplifies a case in which "0" is set in advance as a value of the lower bound that is the lower limit value of the number of present people corresponding to the area EA identified with each of the area IDs. However, an integral number equal to or larger than 1 may be set in advance as the value of the lower bound. FIG. 5B exemplifies a case in which "50" or "NA" is set in advance, "NA" representing that the value is not set, as the value of the upper bound as the upper limit value of the number of present people corresponding to the area EA identified with each of the area IDs. However, the value of the upper bound is not limited to the values illustrated in FIG. 5B, and NA or an integral number equal to or larger than 1 may be set in advance as the value of the upper bound. As the value of the upper bound in the area definition table 32B, for example, a value obtained by dividing the space area of the area EA identified with a corresponding area ID by the required space area for one person may be set in advance.

FIG. 5C is a schematic diagram illustrating an example of a data configuration of the error term definition table 32C. The error term definition table 32C is a table specifying an assumed detection error range of the sensor S for each of the sensors S.

The assumed detection error range is represented by an assumed minimum error value and an assumed maximum error value of the sensor S. The error term is an item related to the assumed detection error range of the sensor S. In other words, the error term is a variable representing any of values in the assumed detection error range of the sensor S.

Specifically, the error term definition table 32C is a table in which an error term name, the sensor ID, a lower bound, and an upper bound are associated with each other.

The error term name is a name of the error term. In FIG. 5C, the error term name is represented by epsji. i and j are already described above. That is, epsji represents the error term name of the error term of the sensor S represented by Sji. Specifically, eps11 to eps22 respectively represent error term names of error terms of the sensor S11 to the sensor S22.

The sensor ID is identification information for the sensor S included in the space MS as the observation target. In the present embodiment, as described above, Sji is used for the sensor ID. FIG. 5C illustrates S11 to S22 as respective sensor IDs of the sensor S11 to the sensor S22 included in the space MS as the observation target.

The lower bound in the error term definition table 32C represents a minimum error value of the assumed detection error range of the sensor S identified with a corresponding sensor ID. The upper bound in the error term definition table 32C represents a maximum error value of the assumed detection error range of the sensor S identified with a corresponding sensor ID.

The assumed detection error range of each of the sensors S is specified by the lower bound and the upper bound in the error term definition table 32C. That is, in the error term definition table 32C, the assumed detection error range specified by the lower bound and the upper bound, and the error term name of the error term representing the variable in the assumed detection error range of each of the sensors S identified with the sensor ID are associated with each other and set in advance.

In FIG. 5C, an example is illustrated such that one error term is set for each one of the sensors S. The present embodiment can also be applied to a form in which plural error terms are set for each one of the sensors S, or a form in which the error term is not set for each one of the sensors S.

FIG. 5D is an explanatory diagram of an example of a data configuration of the error model definition table 32D. The error model definition table 32D is a table specifying a format of the constraint expression for each of the sensors S included in the space MS as the observation target.

Specifically, the error model definition table 32D is a table in which the sensor ID, the observation value variable, the error model, an upper bound, and a lower bound are associated with each other. The sensor ID is the same as that described above. The observation value variable in the error model definition table 32D is a variable of the observation value acquired from the sensor S identified with a corresponding sensor ID.

The error model is a model representing a format of the constraint expression. As described above, the error model is a model including the observation value variable of the observation value, and specifying a relation between the variable X and the error term related to the assumed detection error range of the sensor S for each of the sensors S. As described above, the assumed detection error range is represented by the assumed minimum error value and the assumed maximum error value of the sensor S. The error term is a variable representing the assumed detection error range of the sensor S.

For details, the error model represents correspondence between the number of present people in the observation range of the sensor S represented by the observation value variable of the observation value and the error term related to the assumed detection error range of the sensor S, and the number of present people in the observation range of the sensor S represented by the variable X representing the number of present people in the observation unit space.

Specifically, as illustrated in FIG. 5D, the error model is represented by an expression connecting a left side and a right side each representing the number of present people in the observation range of the sensor S by an equal sign. The left side of the expression representing the error model represents the number of present people in the observation range of the sensor S by a total value of the observation value variable and the error term. The right side of the expression representing the error model represents the number of present people in the observation range of the sensor S by a total value of the variables X each representing the number of present people in the observation unit space.

That is, the error model is a model in which the assumed detection error range obtained from the error term "epsji" is represented by the number of present people obtained by the observation value variable and the variable X.

The lower bound in the error model definition table 32D represents a lower limit value of the number of present people that may be observed by the sensor S identified with a corresponding sensor ID. The upper bound in the error model definition table 32D represents an upper limit value of the number of present people that may be observed by the sensor S identified with a corresponding sensor ID.

FIG. 5D exemplifies a case in which "0" is set in advance as the value of the lower bound representing the lower limit value of the number of present people that may be observed by the sensor S identified with the sensor ID. However, an integral number equal to or larger than 1 may be set in advance as the value of the lower bound. FIG. 5D exemplifies a case in which an integral number or "NA" is set in advance, "NA" representing that the value is not set, as the value of the lower bound representing the lower limit value of the number of present people that may be observed by the sensor S identified with the sensor ID. As the value of the upper bound in the error model definition table 32D, for example, a value obtained by dividing the space area of the observation range of the sensor S identified with a corresponding sensor ID by the required space area for one person may be set in advance.

Each of the tables illustrated in FIG. 5A to FIG. 5D may further include a field representing a time period. Values representing the upper bound and the lower bound corresponding to the time period may be set in advance for each time period.

Returning to FIG. 1, the description will be continued. The derivation unit 20B derives the constraint expression for each of the sensors S by substituting the observation value acquired from the acquisition unit 20A for a term of the observation value variable included in the error model of the error model DB 32.

Specifically, the derivation unit 20B reads the error model DB 32 from the storage unit 30.

The derivation unit 20B then sets corresponding upper bound and lower bound specified in the variable definition table 32A for each of the variables X1 identified with the respective variable names specified in the variable definition table 32A. The derivation unit 20B also sets corresponding lower bound and upper bound specified in the area definition table 32B for each of the areas EA identified with the respective area IDs specified in the area definition table 32B. The derivation unit 20B also sets corresponding lower bound and upper bound specified in the error term definition table 32C for each of the error terms identified with the respective error term names specified in the error term definition table 32C. The derivation unit 20B does not set a value for the upper bound and the lower bound for which "NA" is set.

The derivation unit 20B then acquires the observation value of each of the sensor S included in the observation value file 40 received from the acquisition unit 20A. The derivation unit 20B also reads the error model corresponding to each of the sensor IDs in the error model definition table 32D. The derivation unit 20B then derives the constraint expression by substituting the acquired observation value for the term of the observation value variable included in the error model of the corresponding sensor S.

For example, the derivation unit 20B substituting the observation value acquired from the sensor S11 identified with the sensor ID "S11" for the term of the observation value variable "Y11" of the error model corresponding to the sensor ID "S11" in the error model definition table 32D illustrated in FIG. 5D. Through this processing, the derivation unit 20B derives the constraint expression for the sensor S11. The derivation unit 20B similarly derives the constraint expression for each of the other sensors S.

The derivation unit 20B then sets the lower bound and the upper bound of the number of present people observed by the sensor S by using any of the left side and the right side of the derived constraint expression.

Specifically, for example, the following describes a case in which the derivation unit 20B derives the constraint expression, and the upper bound and the lower bound corresponding to the constraint expression using the error model definition table 32D illustrated in FIG. 5A to FIG. 5D. Assumed is a case in which the observation values of the sensor S11, the sensor S12, the sensor S13, the sensor S21, and the sensor S22 are 28, 21, 16, 10, and 10, respectively. In this case, the upper bound and the lower bound set by each of the tables included in the error model DB 32, and the constraint expression are as follows.

Lower bound of each variable X set by variable definition table 32A $0 \leq X1$ $0 \leq X2$ $0 \leq X3$ $0 \leq X4$ $0 \leq X5$ $0 \leq X6$ $0 \leq X7$ $0 \leq X8$ As illustrated in FIG. 5A, "NA" is set for the upper bound, so that only the lower bound is set.

Lower bound and upper bound of number of present people for each area EA set by area definition table 32B $0 \leq X1 \leq 50$ $0 \leq X2+X3 \leq 50$ $0 \leq X4+X5 \leq 50$ $0 \leq X6+X7+X8$ Lower bound and upper bound of error term of assumed detection error range for each sensor S set by error term definition table 32C $-5 \leq eps11 \leq 5$ $-10 \leq eps12 \leq 9$ $-3 \leq eps21$ $eps22 \leq 2$ Constraint expression derived for each sensor S by error model definition table 32D $28+eps11=X1+X2+X8$ $21+eps12=X3+X4$ $16+eps13=X5+X6+X7$ $10+eps21=X6$ $10+eps22=X7+X8$ Upper bound and lower bound of number of present people that may be observed set for each sensor S by error model definition table 32D $0 \leq 28+eps11 \leq 60$ $0 \leq 21+eps12 \leq 90$ $0 \leq 16+eps13 \leq 30$ Through the processing above, the derivation unit 20B derives the constraint expression, and setting information in which at least one of the lower bound and the upper bound of at least one of the variable X, the number of present people who may be present in the area EA, the error term, and the number of present people that may be observed by the sensor S is set.

Returning to FIG. 1, the description will be continued. The derivation unit 20B outputs the derived constraint expression and the setting information to the range calculation unit 20C.

The range calculation unit 20C calculates a possible range of the number of present people in the area EA using the constraint expression derived by the derivation unit 20B. In the present embodiment, the range calculation unit 20C calculates the possible range of the number of present people for each of the areas EA using the constraint expression and the setting information received from the derivation unit 20B.

Specifically, the range calculation unit 20C calculates the possible range of the number of present people by calculating endpoints of the possible range of the number of present people by solving the mathematical optimization problem using the constraint expression.

Figures 6, 7:
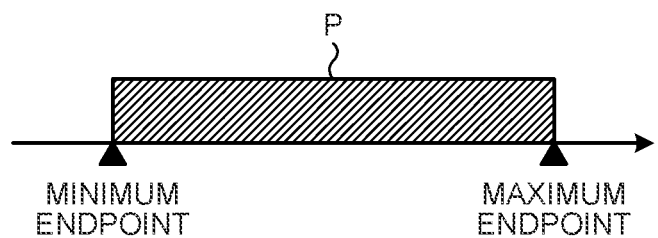
FIG. 6 is an explanatory diagram of a possible range of the number of present people.
FIG. 7 is a schematic diagram of a data configuration of a range definition DB.

FIG. 6 is an explanatory diagram of an example of the possible range of the number of present people. The endpoints of the possible range of the number of present people are specified by a minimum endpoint and a maximum endpoint. That is, the possible range of the number of present people is a range represented by a range P from the minimum endpoint to the maximum endpoint as the endpoints.

The range calculation unit 20C calculates the endpoints of the possible range of the number of present people for each of the areas EA using the range definition DB 34 for defining the minimum endpoint and the maximum endpoint of the possible range of the number of present people.

FIG. 7 is a schematic diagram illustrating an example of a data configuration of the range definition DB 34. The range definition DB 34 is a database that previously specifies an endpoint definition for a solution of the mathematical optimization problem.

The range definition DB 34 is a database in which the area ID and the endpoint definition are associated with each other. The area ID is the same as that described above.

The endpoint definition includes a definition of the minimum endpoint and a definition of the maximum endpoint. The definition of the minimum endpoint represents a definition of the minimum endpoint of the possible range of the number of present people in the area EA identified with a corresponding area ID. The definition of the maximum endpoint represents a definition of the maximum endpoint of the possible range of the number of present people in the area EA identified with a corresponding area ID.

In the endpoint definition, an optional definition is determined in advance for the solution obtained by solving the mathematical optimization problem using the setting information set by the derivation unit 20B and the constraint expression. For example, as illustrated in FIG. 7, as definitions of the minimum endpoint, "minimum value", "minimum value−1", "minimum value−2", "minimum value× 0.8", or the like are set in advance.

The "minimum value" set in the range definition DB 34 represents a solution obtained by solving a minimization problem using the setting information and the constraint expression by the range calculation unit 20C. That is, "minimum value" as the definition of the minimum endpoint represents that a minimum value as the solution of the minimization problem is assumed to be the minimum endpoint. Additionally, "minimum value+K", "minimum value− K", or "minimum value×K" (K is a numerical value larger than 0) as the definition of the minimum endpoint represents that a value obtained by correcting the minimum value as the solution of the minimization problem using the expression represented by the definition is assumed to be the minimum endpoint.

For example, as illustrated in FIG. 7, "maximum value", "maximum value+2", "maximum value×1.5", and the like are set in advance as definitions of the maximum endpoint. That is, "maximum value" as the definition of the maximum endpoint represents that a maximum value as a solution of a maximization problem is assumed to be the maximum endpoint. Additionally, "maximum value+K", "maximum value−K", or "maximum value×K" (K is a numerical value larger than 0) as the definition of the maximum endpoint represents that a value obtained by correcting the maximum value as the solution of the maximization problem using the expression represented by the definition is assumed to be the maximum endpoint.

Note that the expression representing the endpoint definition may be any expression using the maximum value or the minimum value as the solution of the mathematical optimization problem, and is not limited to the expression illustrated in FIG. 7.

The range calculation unit 20C calculates the possible range of the number of present people for each of the areas EA using the constraint expression and the setting information received from the derivation unit 20B, and the range definition DB 34. Specifically, the range calculation unit 20C calculates the endpoints of the possible range by solving the mathematical optimization problem that satisfies the constraint condition represented by the constraint expression, and maximizes and minimizes an objective function represented by the configuration of the variable X of the observation unit space included in the area EA.

Specifically, the range calculation unit 20C solves the maximization problem that satisfies the constraint condition represented by the constraint expression and the setting information received from the derivation unit 20B, and maximizes the objective function represented by the configuration of the variable X representing the number of present people in the area EA as a processing target. The range calculation unit 20C then calculates the maximum value as the solution of the maximization problem by solving the maximization problem.

For example, assumed is a case of calculating the possible range of the number of present people for the area EA3. In this case, the range calculation unit 20C solves the maximization problem that satisfies the constraint condition represented by the constraint expression and the setting information corresponding to the area EA, and maximizes a value of the number of present people represented by "X4+X5" as the configuration of the variables X of the area EA3. By solving this maximization problem, the maximum value described above as the solution of the maximization problem is calculated.

Specifically, the range calculation unit 20C also solves the minimization problem that satisfies the constraint condition represented by the constraint expression and the setting information received from the derivation unit 20B, and minimizes the objective function represented by the configuration of the variable X representing the number of present people in the area EA as a processing target. The range calculation unit 20C then calculates the minimum value described above as the solution of the minimization problem by solving the minimization problem.

For example, assumed is a case of calculating the possible range of the number of present people for the area EA3. In this case, the range calculation unit 20C solves the minimization problem that satisfies the constraint condition represented by the constraint expression and the setting information corresponding to the area EA, and minimizes a value of the objective function represented by "X4+X5" as the configuration of the variables X of the area EA2. By solving the minimization problem, the minimum value described above as the solution of the minimization problem is calculated.

The range calculation unit 20C then derives the maximum endpoint of the possible range of the number of present people in accordance with the calculated maximum value as the solution of the maximization problem and the definition of the maximum endpoint specified in the range definition DB 34. Similarly, the range calculation unit 20C derives the minimum endpoint of the possible range of the number of present people in accordance with the calculated minimum value as the solution of the minimization problem and the definition of the minimum endpoint specified in the range definition DB 34.

For example, assumed is a case in which the range calculation unit 20C derives the maximum endpoint and the minimum endpoint of the possible range of the number of present people in the area EA3 using the range definition DB 34 illustrated in FIG. 7. In this case, the range calculation unit 20C calculates a value obtained by adding "2" to the maximum value obtained by solving the maximization problem as the maximum endpoint of the possible range of the number of present people in the area EA3. The range calculation unit 20C also calculates a value obtained by adding "−2" to the minimum value obtained by solving the minimization problem as the minimum endpoint of the possible range of the number of present people in the area EA3.

That is, the range calculation unit 20C calculates, as the endpoints including the maximum endpoint and the minimum endpoint, values obtained by correcting solutions obtained by solving mathematical optimization problems on the basis of the predetermined endpoint definitions specified in the range definition DB 34. In a case in which "minimum value" or "maximum value" representing that the solution of the mathematical optimization problem is assumed to be the endpoint is specified as the endpoint definition, the range calculation unit 20C may use the solution of the mathematical optimization problem as the maximum endpoint or the minimum endpoint.

Similarly, the range calculation unit 20C calculates the possible range of the number of present people for each of the areas EA by calculating the maximum endpoint and the minimum endpoint for each of the areas EA.

The range calculation unit 20C then outputs the possible range of the number of present people represented by the maximum endpoint and the minimum endpoint calculated for each of the areas EA to the reliability calculation unit 20D.

Returning to FIG. 1, the description will be continued.

The reliability calculation unit 20D calculates reliability of the estimation value of the number of present people for each of the areas EA by using the possible range of the number of present people calculated for each of the areas EA by the range calculation unit 20C.

For example, the reliability calculation unit 20D assumes that a true value of the number of present people is present at any one of the minimum endpoint and the maximum endpoint of the possible range of the number of present people. The reliability calculation unit 20D then calculates, as the reliability, an inverse number of a difference between the maximum endpoint and the minimum endpoint of the possible range of the number of present people. Specifically, the reliability calculation unit 20D calculates the reliability using the following expression (A).

$$\text{Reliability}=1/\{(\text{maximum endpoint}-\text{minimum endpoint})+1)\} \quad (A)$$

The reliability calculation unit 20D may perform calculation assuming that the true value of the number of present people is present as any one of nonnegative integers between the minimum endpoint and the maximum endpoint represented by the possible range of the number of present people.

The reliability calculation unit 20D may calculate, as the reliability, a value proportional to the difference between the maximum endpoint and the minimum endpoint of the possible range of the number of present people. Specifically, the reliability calculation unit 20D may calculate, as the reliability, a range obtained by normalizing the possible range of the number of present people using a maximum range of the possible range of the number of present people.

The maximum range of the possible range of the number of present people is represented by a range from the lower bound to the upper bound corresponding to the area EA identified with the area ID in the area definition table 32B illustrated in FIG. 5B. The reliability calculation unit 20D may obtain the maximum range of the possible range of the number of present people for each of the areas EA to calculate the reliability by reading the setting information. Specifically, the reliability calculation unit 20D may calculate the reliability using the following expression (B).

$$\text{Reliability}=\{(\text{upper bound}-\text{lower bound}+1)-(\text{maximum endpoint}-\text{minimum endpoint})\}/(\text{upper bound}-\text{lower bound}+1) \quad (B)$$

The upper bound and the lower bound in the expression (B) respectively represent values of the upper bound and the lower bound corresponding to the area ID in the area definition table 32B (refer to FIG. 5B).

The reliability calculation unit 20D calculates the reliability by the calculation described above for each of all the areas EA included in the space MS as the observation target. The reliability calculation unit 20D then outputs a reliability file 44 including the possible range of the number of present people and the reliability of each of all the areas EA.

FIG. 8 is a schematic diagram illustrating an example of a data configuration of the reliability file 44. The reliability file 44 is a table in which the area ID, the minimum endpoint, the maximum endpoint, and the reliability are associated with each other. The area ID is the same as that described above. The minimum endpoint and the maximum endpoint are the minimum endpoint and the maximum endpoint of the possible range of the number of present people calculated by the range calculation unit 20C.

Returning to FIG. 1, the description will be continued. Next, the following describes the estimation unit 20E.

The estimation unit 20E estimates the number of present people in the area EA on the basis of the observation value. The estimation unit 20E may estimate the number of present people in the area EA on the basis of the observation value by using a well-known method.

Specifically, the estimation unit 20E acquires the observation value file 40 from the acquisition unit 20A via the derivation unit 20B. The estimation unit 20E may directly acquire the observation value file 40 from the acquisition unit 20A. The estimation unit 20E then estimates the number of present people for each of the areas EA on the basis of the observation value by using a machine learning model such as regression, a neural network, and deep learning, or well-known estimation processing such as mathematical optimization. The estimation unit 20E outputs an estimation value file 46 including an estimation value estimated for each of the areas EA.

FIG. 9 is a schematic diagram illustrating an example of a data configuration of the estimation value file 46. The estimation value file 46 is a table in which the area ID and the estimation value of the number of present people in the area EA identified with the area ID are associated with each other. FIG. 9 exemplifies a table in which one area ID is associated with one estimation value to be registered. However, the estimation value file 46 may be a table in which one area ID is associated with the estimation values to be registered. For example, the estimation value file 46 may be a table in which one area ID is associated with estimation values of observation dates and times that are different from each other.

Next, the following describes an example of a procedure of information processing performed by the information processing device 10 according to the present embodiment.

Figure 10:
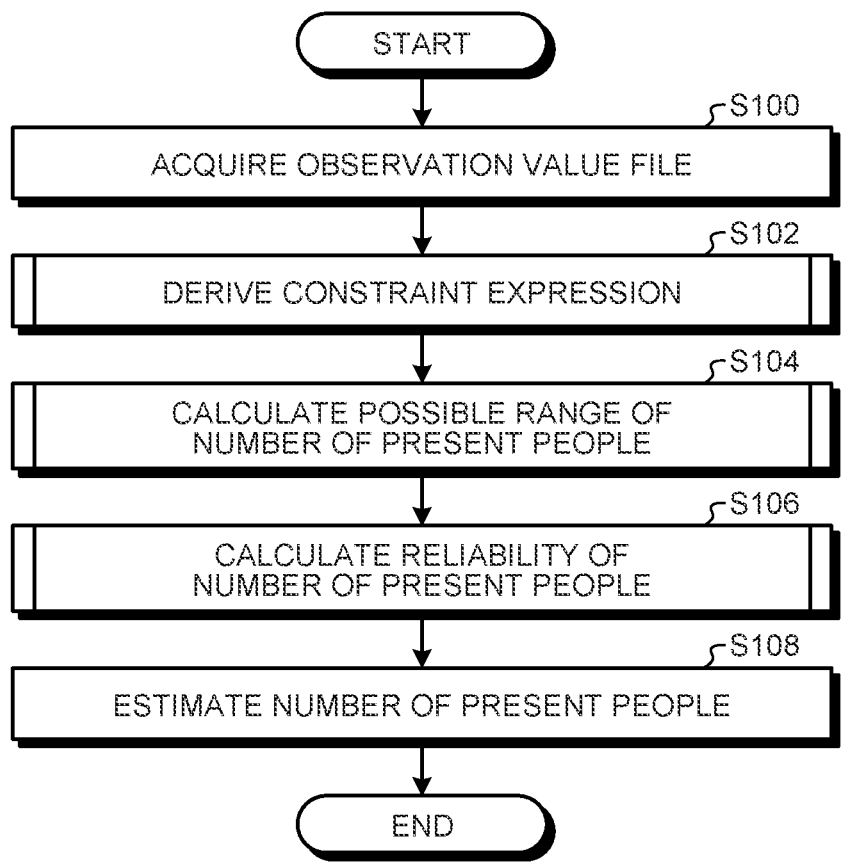
FIG. 10 is a flowchart illustrating a procedure of information processing.

FIG. 10 is a flowchart illustrating an example of the procedure of information processing performed by the information processing device 10 according to the present embodiment.

The acquisition unit 20A of the information processing device 10 acquires the observation value file 40 from the sensor S (Step S100). The derivation unit 20B performs constraint expression derivation processing for deriving the constraint expression for each of the areas EA on the basis of the observation value file 40 acquired at Step S100 (Step S102).

Next, the range calculation unit 20C performs range calculation processing for calculating the possible range of the number of present people for each of the areas EA by using the constraint expression derived at Step S102 (Step S104).

Next, the reliability calculation unit 20D performs reliability calculation processing for calculating the reliability of the estimation value of the number of present people for each of the areas EA by using the possible range of the number of present people calculated at Step S104 (Step S106).

Next, the estimation unit 20E performs estimation processing for estimating the number of present people for each of the areas EA on the basis of the observation value file acquired at Step S100 (Step S108). This routine is then ended.

Next, the following describes an example of a procedure of the constraint expression derivation processing (Step S102 in FIG. 10) performed by the derivation unit 20B.

Figure 11:
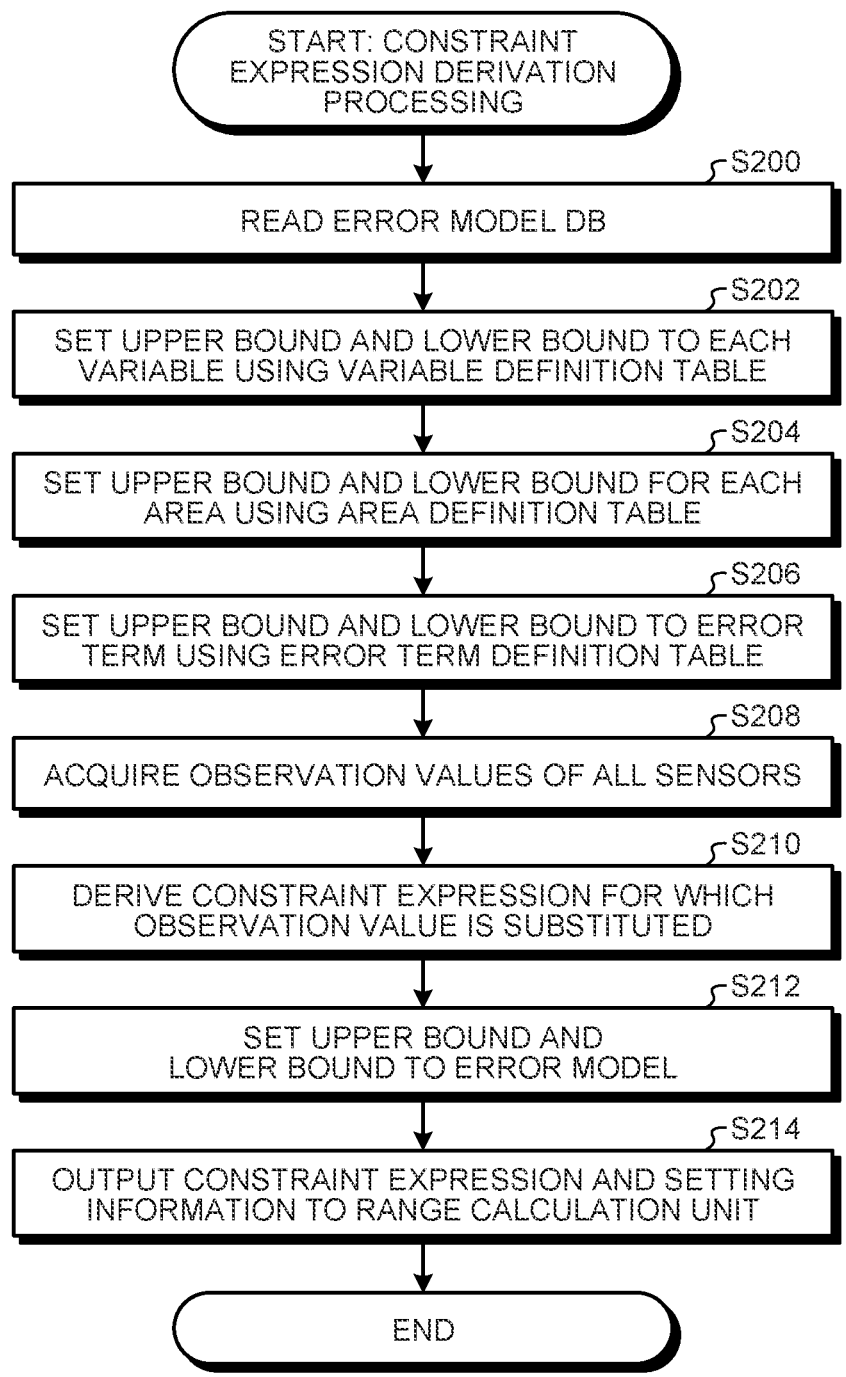
FIG. 11 is a flowchart illustrating a procedure of constraint expression derivation processing.

FIG. 11 is a flowchart illustrating an example of the procedure of the constraint expression derivation processing performed by the derivation unit 20B.

The derivation unit 20B reads the error model DB 32 from the storage unit 30 (Step S200).

The derivation unit 20B sets the upper bound and the lower bound of the number of present people to each of the variables X using the variable definition table 32A included in the error model DB 32 read at Step S200 (Step S202).

Next, the derivation unit 20B sets the upper bound and the lower bound of the number of present people for each of the areas EA using the area definition table 32B included in the error model DB 32 read at Step S200 (Step S204).

The derivation unit 20B also sets the lower bound and the upper bound for each error term of the sensor S using the error term definition table 32C included in the error model DB 32 read at Step S200 (Step S206).

Next, the derivation unit 20B acquires observation values of all of the sensors S included in the space MS as the observation target (Step S208). The derivation unit 20B acquires the observation values of all of the sensors S by reading the observation values included in the observation value file 40 received from the acquisition unit 20A.

Next, the derivation unit 20B reads the error model corresponding to each of the sensor IDs in the error model definition table 32D included in the error model DB 32 read at Step S200. The derivation unit 20B then derives the constraint expression by substituting the observation value acquired at Step S208 for the term of the observation value variable included in the error model of the corresponding sensor S (Step S210).

Through the processing at Step S210, the derivation unit 20B derives the constraint expression for each of the sensors S.

The derivation unit 20B then sets the lower bound and the upper bound to the error model representing the constraint expression using any of the left side and the right side of the constraint expression derived at Step S210 (Step S212).

The setting information set through the processing at Step S202 to Step S206 and Step S212, and the constraint expression derived at Step S210 are output to the range calculation unit 20C (Step S214). This routine is then ended.

Next, the following describes an example of a procedure of range calculation processing (refer to Step S104 in FIG. 10) performed by the range calculation unit 20C.

Figure 12:
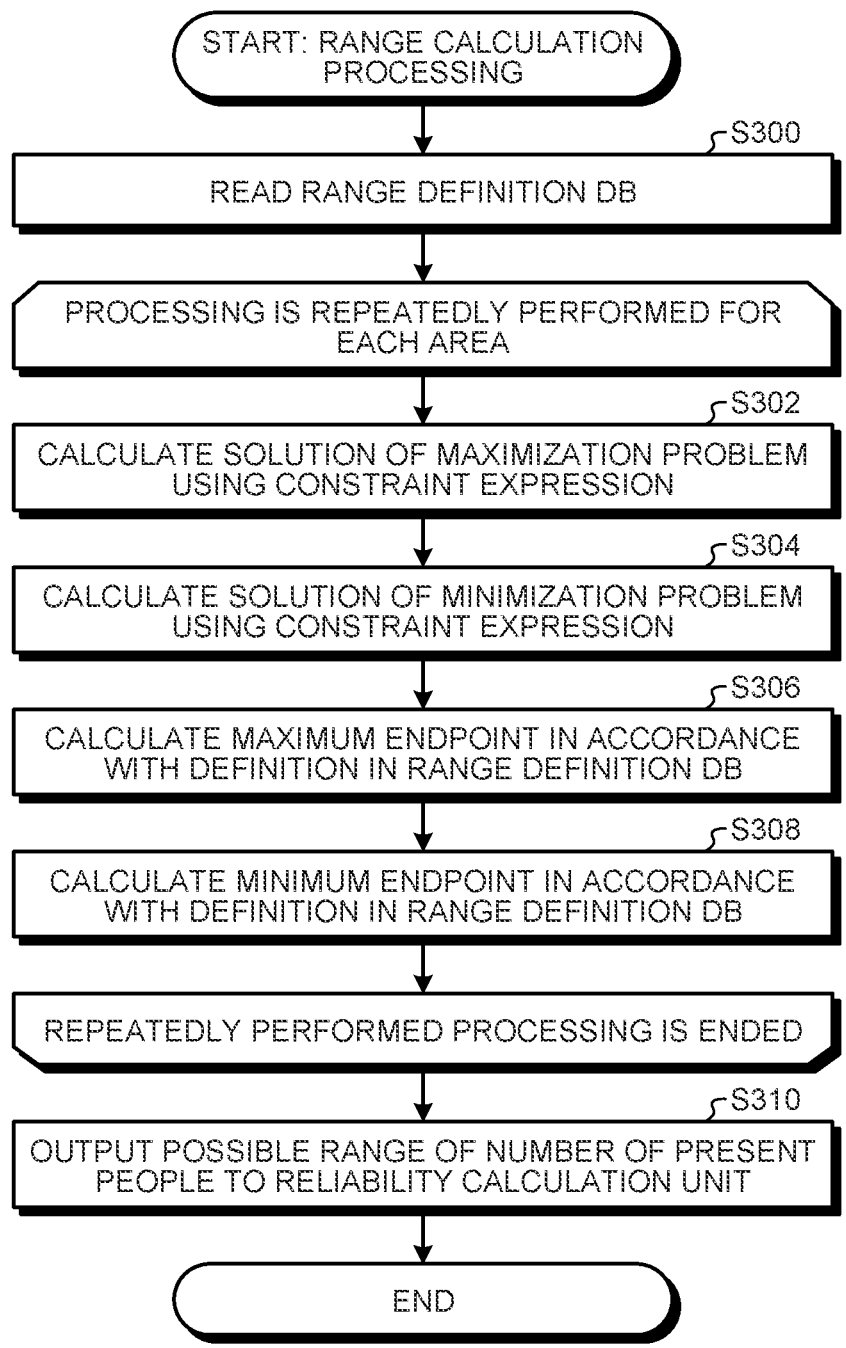
FIG. 12 is a flowchart illustrating a procedure of range calculation processing.

FIG. 12 is a flowchart illustrating an example of the procedure of the range calculation processing performed by the range calculation unit 20C.

The range calculation unit 20C reads the range definition DB 34 from the storage unit 30 (Step S300).

Next, the range calculation unit 20C performs the processing at Step S302 to Step S308 for each of the areas EA included in the space MS as the observation target.

Specifically, the range calculation unit 20C calculates a solution of the maximization problem of the number of present people in the area EA as a processing target using the constraint expression derived by the derivation unit 20B (Step S302). Specifically, the range calculation unit 20C calculates the solution of the maximization problem that satisfies the constraint condition represented by the constraint expression and the setting information received from the derivation unit 20B, and maximizes the objective function represented by the configuration of the variable X representing the number of present people in the area EA as a processing target.

The range calculation unit 20C also calculates a solution of the minimization problem of the number of present people in the area EA as a processing target using the constraint expression derived by the derivation unit 20B (Step S304). Specifically, the range calculation unit 20C also calculates a solution of the minimization problem that satisfies the constraint condition represented by the constraint expression and the setting information received from the derivation unit 20B, and minimizes the objective function represented by the configuration of the variable X representing the number of present people in the area EA as a processing target.

Next, by using the maximum value as the solution of the maximization problem calculated at Step S302 and the definition of the maximum endpoint specified in the range definition DB 34, the range calculation unit 20C derives the maximum endpoint of the possible range of the number of present people in accordance with the definition (Step S306).

By using the minimum value as the solution of the minimization problem calculated at Step S304 and the definition of the minimum endpoint specified in the range definition DB 34, the range calculation unit 20C derives the minimum endpoint of the possible range of the number of present people in accordance with the definition (Step S308).

After performing the processing at Step S302 to Step S308 for each of the areas EA included in the space MS as the observation target, the range calculation unit 20C advances the process to Step S310. At Step S310, the range calculation unit 20C outputs, to the reliability calculation unit 20D, the possible range of the number of present people in each of all the areas EA included in the space MS as the observation target derived by repeatedly performing the processing at Step S302 to Step S308 (Step S310). This routine is then ended.

Next, the following describes an example of a procedure of the reliability calculation processing (Step S106 in FIG. 10) performed by the reliability calculation unit 20D.

Figure 13:
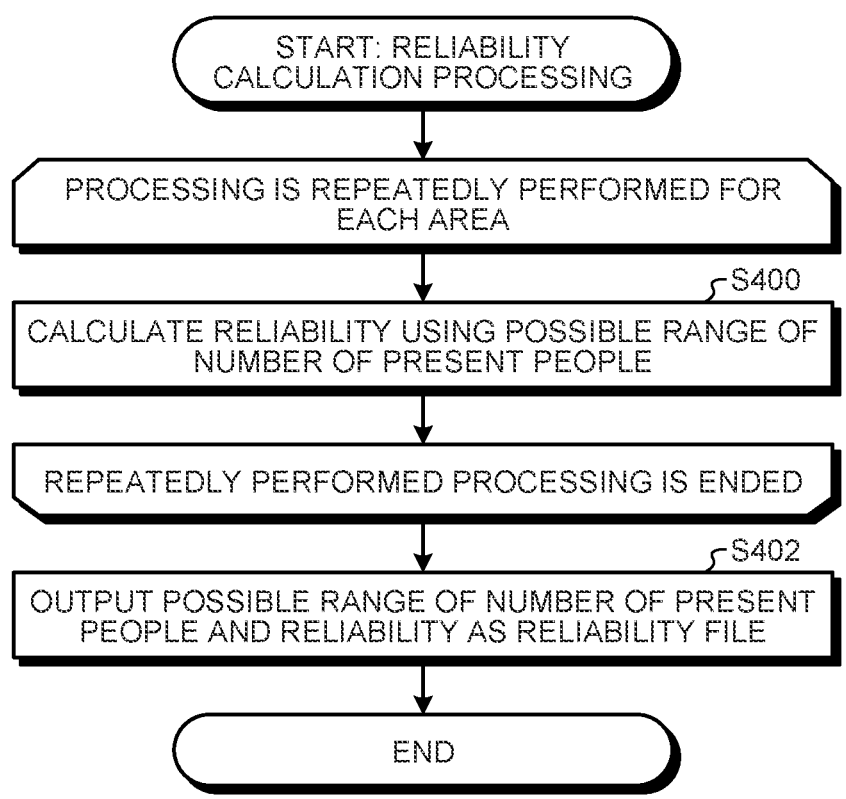
FIG. 13 is a flowchart illustrating a procedure of reliability calculation processing.

FIG. 13 is a flowchart illustrating an example of the procedure of the reliability calculation processing performed by the reliability calculation unit 20D.

The reliability calculation unit 20D calculates the reliability of the estimation value of the number of present people for each of the areas EA using the possible range of the number of present people calculated by the range calculation unit 20C (Step S400).

The reliability calculation unit 20D then outputs the reliability file 44 including the reliability calculated for each of all the areas EA included in the space MS as the observation target and the possible range of the number of present people received from the range calculation unit 20C (Step S402). This routine is then ended.

As described above, the information processing device 10 according to the present embodiment includes the acquisition unit 20A, the derivation unit 20B, the range calculation unit 20C, and the reliability calculation unit 20D. The acquisition unit 20A acquires observation values of the number of present people from one or more sensors S disposed in at least part of one or more areas EA. The derivation unit 20B derives, for each of the sensors S, the constraint expression obtained by substituting the acquired observation value for the term of the observation value variable included in the error model. The error model is a model representing correspondence between the number of present people in the observation range of the sensor S represented by the observation value variable of the observation value and the error term related to the assumed detection error range of the sensor S, and the number of present people in the observation range of the sensor S represented by the variable X representing the number of present people in the observation unit space that is determined by the observation range of the sensor S and the range of the area EA. The range calculation unit 20C calculates the possible range of the number of present people in the area EA using the constraint expression. The reliability calculation unit calculates the reliability of the estimation value of the number of present people for each of the areas EA using the possible range of the number of present people.

In this way, the information processing device 10 according to the present embodiment calculates the reliability of the estimation value of the number of present people in the area EA on the basis of the observation value and the constraint expression without using the estimation value of the number of present people. That is, the information processing device 10 according to the present embodiment calculates the reliability of the estimation value of the number of present people in the area EA using independent logic different from estimation logic for the number of present people.

Therefore, the information processing device 10 according to the present embodiment can calculate the reliability of the estimation value with high accuracy even in a case in which an assumption used for the estimation logic for the number of present people is different from an event in a real environment.

Accordingly, the information processing device 10 according to the present embodiment can calculate the reliability of the estimation value of the number of present people in the area EA with high accuracy.

The information processing device 10 according to the present embodiment calculates the possible range of the number of present people for each of the areas EA using the constraint expression obtained by substituting the acquired observation value for the term of the observation value variable included in the error model, and calculates the reliability of the estimation value of the number of present people for each of the areas EA using the calculated possible range. The error model is a model representing correspondence between the number of present people in the observation range of the sensor S represented by the observation value variable of the observation value and the error term related to the assumed detection error range of the sensor S, and the number of present people in the observation range of the sensor S represented by the variable X representing the number of present people in the observation unit space that is determined by the observation range of the sensor S and the range of the area EA. That is, the error model is a model representing the assumed detection error range represented by the error term using the number of present people represented by the observation value variable and the variable X.

Thus, the information processing device 10 according to the present embodiment can calculate the possible range of the number of present people in the area EA assuming the assumed detection error range of the sensor S using the constraint expression, and calculate the reliability of the estimation value of the number of present people in the area EA on the basis of the possible range.

Accordingly, the information processing device 10 according to the present embodiment can calculate the reliability of the estimation value of the number of present people in the area with high accuracy.

Second Embodiment

The present embodiment describes a form of calculating the possible range of the number of present people using a method different from that in the embodiment described above.

Figure 14:
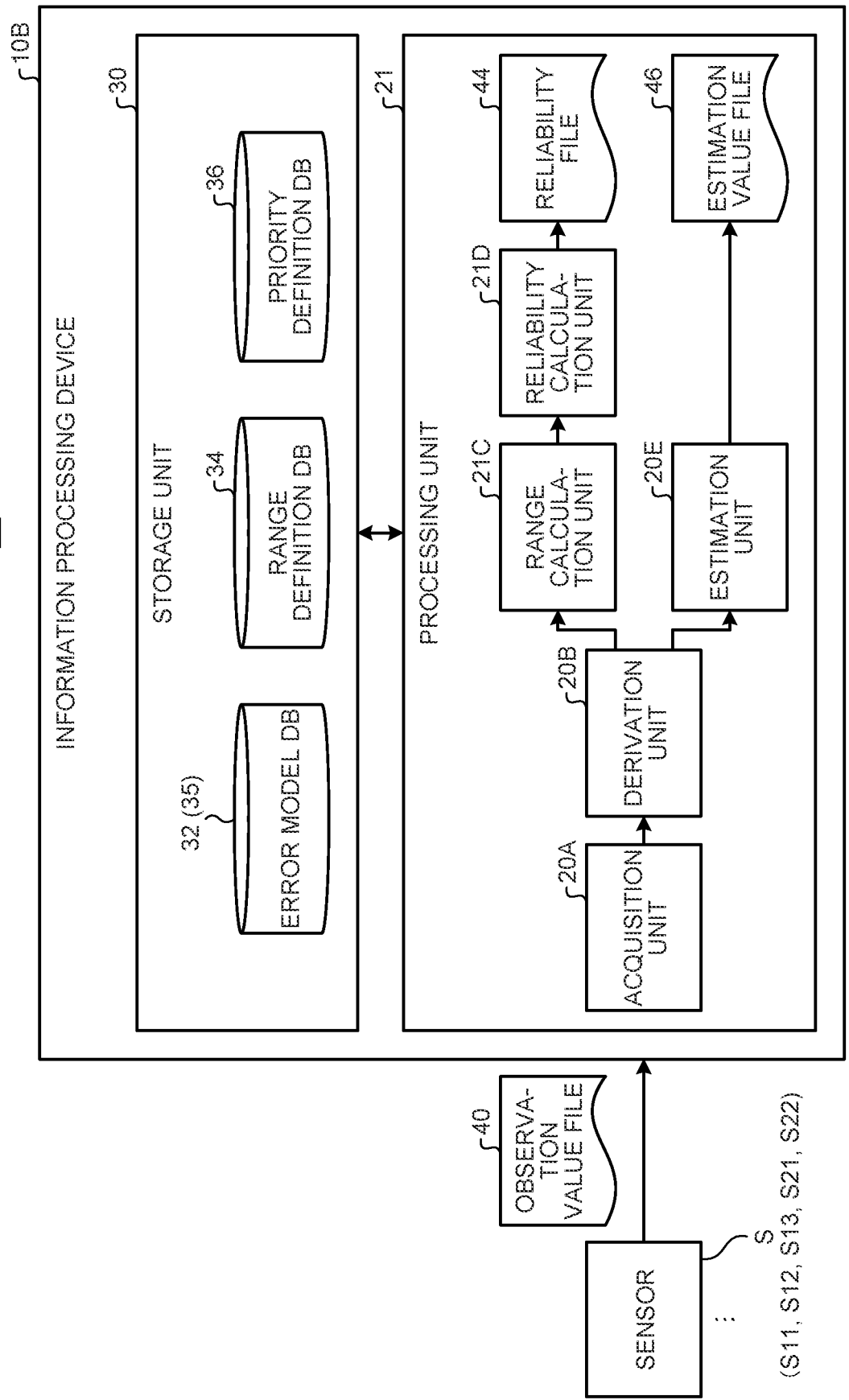
FIG. 14 is a schematic diagram of an information processing system.

FIG. 14 is a schematic diagram of an example of an information processing system 1B according to the present embodiment.

The information processing system 1B includes the sensor S and an information processing device 10B. The information processing device 10B and the sensor S are connected to each other in a communicable manner. The sensor S is the same as that in the embodiment described above.

The information processing device 10B includes a processing unit 21 and the storage unit 30. The processing unit 21 and the storage unit 30 are connected to each other in a communicable manner via a bus and the like.

The storage unit 30 stores the error model DB 32, the range definition DB 34, and a priority definition DB 36. The error model DB 32 and the range definition DB 34 are the same as those described above.

The priority definition DB 36 is information specifying a weight value for the sensor S. The priority definition DB 36 corresponds to priority definition information.

Specifically, the priority definition DB 36 is a database in which a combination of weight values is specified in advance for each combination of groups to which the sensors S belong.

FIG. 15A and FIG. 15B are schematic diagrams illustrating an example of a data configuration of the priority definition DB 36. The priority definition DB 36 includes a group definition list group 36A and a weight definition table 36B.

FIG. 15A is a schematic diagram illustrating an example of a data configuration of the group definition list group 36A. As illustrated in FIG. 15A, the sensors S included in the space MS as the observation target are classified into two or more groups in accordance with a condition determined in advance. The same weight value is specified for the sensors S belonging to the same group. FIG. 15A exemplifies a state in which the sensors S are classified according to the types of the sensors S. A group ID for identifying the group is given to each of the groups in advance.

FIG. 15B is a schematic diagram illustrating an example of a data configuration of the weight definition table 36B. The weight definition table 36B is a table in which a combination of different weight values is set in advance for each combination of the groups to which the sensors S belong. The weight value is information representing a weight for the observation value of the sensor S.

FIG. 15B exemplifies a case in which K combinations of weight values are set. K is an integral number equal to or larger than 1.

Returning to FIG. 14, the description will be continued. The processing unit 21 performs information processing in the information processing device 10B. The processing unit 21 includes the acquisition unit 20A, the derivation unit 20B, a range calculation unit 21C, a reliability calculation unit 21D, and the estimation unit 20E. The acquisition unit 20A, the derivation unit 20B, and the estimation unit 20E are the same as those in the first embodiment described above.

Similarly to the range calculation unit 20C in the embodiment described above, the range calculation unit 21C calculates the possible range of the number of present people in the area EA using the constraint expression derived by the derivation unit 20B.

In the present embodiment, on the basis of the priority definition DB 36, the range calculation unit 21C obtains estimation information about the number of present people for each combination of the weight values by solving a mathematical optimization problem of an objective function that satisfies the constraint condition represented by the constraint expression, and is specified by the error term and the K combinations of the weight values specified in the priority definition DB 36. The estimation information is a value obtained by estimating the number of present people, that is, a value representing the number of people. The range calculation unit 21C then calculates the possible range of the number of present people using the estimation information about the number of present people obtained for each combination of the weight values.

Specifically, the range calculation unit 21C sets the objective function represented by the following expression (C) for each of the K combinations of the weight values specified in the weight definition table 36B.

$$\operatorname*{argmin}\sum_{g\in G} Wg \sum_{j=1}^{pg} f(epsg)j \quad (C)$$

In the expression (C) described above, g represents the group ID. Wg represents the weight value of the group identified with the group ID "g" in the weight definition table 36B. epsgj represents the error term, that is, the error term of the j-th sensor S of the group identified with the group ID "g" in the group definition list group 36A. pg represents the number of the sensors S belonging to the group identified with the group ID "g". f represents a function for converting the error term into a square error or an absolute value.

For each of the areas EA and for each of the K combinations of the weight values specified in the weight definition table 36B, the range calculation unit 21C substitutes the weight value "Wg" of each group included in the combination for the objective function using the error term represented by the expression (C) described above. The range calculation unit 21C solves the mathematical optimization problem of the objective function represented by the expression (C) described above for which the weight value is substituted. At this point, the range calculation unit 21C solves the mathematical optimization problem of the objective function using the constraint expression and the setting information derived by the derivation unit 20B as the constraint condition.

Through the processing above, the range calculation unit 21C obtains the estimation information about the number of present people corresponding to each of the K combinations of the weight values for each of the areas EA.

The range calculation unit 21C then derives the maximum endpoint and the minimum endpoint of the number of present people in accordance with a definition specified in the range definition DB 34 using the estimation information about the number of present people corresponding to each of the K combinations of the weight values obtained for each of the areas EA. That is, the range calculation unit 21C calculates, for each of the areas EA, the possible range of the number of present people specified by the maximum endpoint and the minimum endpoint. The range calculation unit 21C then outputs, to the reliability calculation unit 21D, the possible range of the number of present people specified by the maximum endpoint and the minimum endpoint.

Alternatively, in place of the maximum endpoint and the minimum endpoint, the range calculation unit 21C may output, to the reliability calculation unit 21D, variation in the estimation information about the number of present people obtained for each combination of the weight values as the possible range.

In this case, the range calculation unit 21C may output a simulation table as the possible range to the reliability calculation unit 21D. The simulation table is a table representing, for each of the areas EA, the variation in the estimation information as the estimation information about the number of present people obtained for each of the K combinations of the weight values.

FIG. 16 is a schematic diagram illustrating an example of a data configuration of a simulation table 38. The simulation table 38 is a table in which the area ID and the estimation information about the number of present people obtained for each of the K combinations of the weight values are associated with each other. In FIG. 16, a simulation to a simulation K are pieces of identification information of the K combinations of the weight values, respectively. The range calculation unit 21C may output, to the reliability calculation unit 21D, the simulation table 38 as the variation in the estimation information about the number of present people in each of the areas EA, that is, the possible range.

In a case of using the simulation table 38 as the possible range of the number of present people, the minimum endpoint and the maximum endpoint of the possible range are not required to be set. Thus, in this case, "NA" representing that there is no set value may be set for the definition of the minimum endpoint and the definition of the maximum endpoint indicated in the endpoint definition in the range definition DB 34.

Returning to FIG. 14, the description will be continued. In a case of acquiring the possible range of the number of present people specified by the maximum endpoint and the minimum endpoint from the range calculation unit 21C, the reliability calculation unit 21D calculates the reliability of the estimation value of the number of present people for each of the areas EA using the possible range of the number of present people similarly to the reliability calculation unit 20D in the embodiment described above.

On the other hand, in a case of acquiring the possible range of the number of present people specified by the simulation table 38 from the range calculation unit 21C, the reliability calculation unit 21D calculates the reliability of the estimation value of the number of present people for each of the areas EA through the following processing.

Specifically, the reliability calculation unit 21D reads the variation in the estimation information as the estimation information about the number of present people obtained for each of the K combinations of the weight values corresponding to the area ID of the area EA for each of the areas EA specified by the simulation table 38.

The reliability calculation unit 21D then calculates, for each of the areas EA, a variance or a standard deviation representing the variation in the estimation information represented by pieces of the estimation information on the basis of the estimation information about the number of present people corresponding to each of the read K combinations of the weight values. The reliability calculation unit 21D then calculates, as the reliability, an inverse number of the variation in the estimation information. Specifically, the reliability calculation unit 21D calculates the reliability for each of the areas EA by the following expression (D) or expression (E).

$$\text{Reliability} = 1/\text{variance} \qquad (D)$$

$$\text{Reliability} = 1/\text{standard deviation} \qquad (E)$$

In the expression (D), "variance" is a variance representing the variation in the estimation information about the number of present people corresponding to each of the read K combinations of the weight values. In the expression (E), "standard deviation" is a standard deviation representing the variation in the estimation information about the number of present people corresponding to each of the read K combinations of the weight values.

Alternatively, the reliability calculation unit 21D may calculate, as the reliability, a value proportional to a difference between a maximum value and a minimum value of the estimation information represented by the variation in the number of present people corresponding to each of the K combinations of the weight values. In this case, the reliability calculation unit 21D may calculate the reliability for each of the areas EA using the following expression (F).

$$\text{Reliability} = \{(\text{maximum value} - \text{minimum value} + 1) - (\text{standard deviation})\}/(\text{maximum value} - \text{minimum value} + 1) \qquad (F)$$

In a case in which the reliability calculation unit 21D acquires the possible range of the number of present people specified by the simulation table 38 from the range calculation unit 21C, the reliability calculation unit 21D may output the reliability file 44 having the following data configuration in place of the reliability file 44 having the data configuration illustrated in FIG. 8.

Specifically, the reliability calculation unit 21D may output, as the reliability file 44, a file in which a field of specifying the reliability is added to the simulation table 38, and the reliability calculated for the area EA identified with the area ID is registered in the field.

Next, the following describes an example of a procedure of range calculation processing (refer to Step S104 in FIG. 10) performed by the range calculation unit 21C of the information processing device 10B according to the present embodiment.

Figure 17:
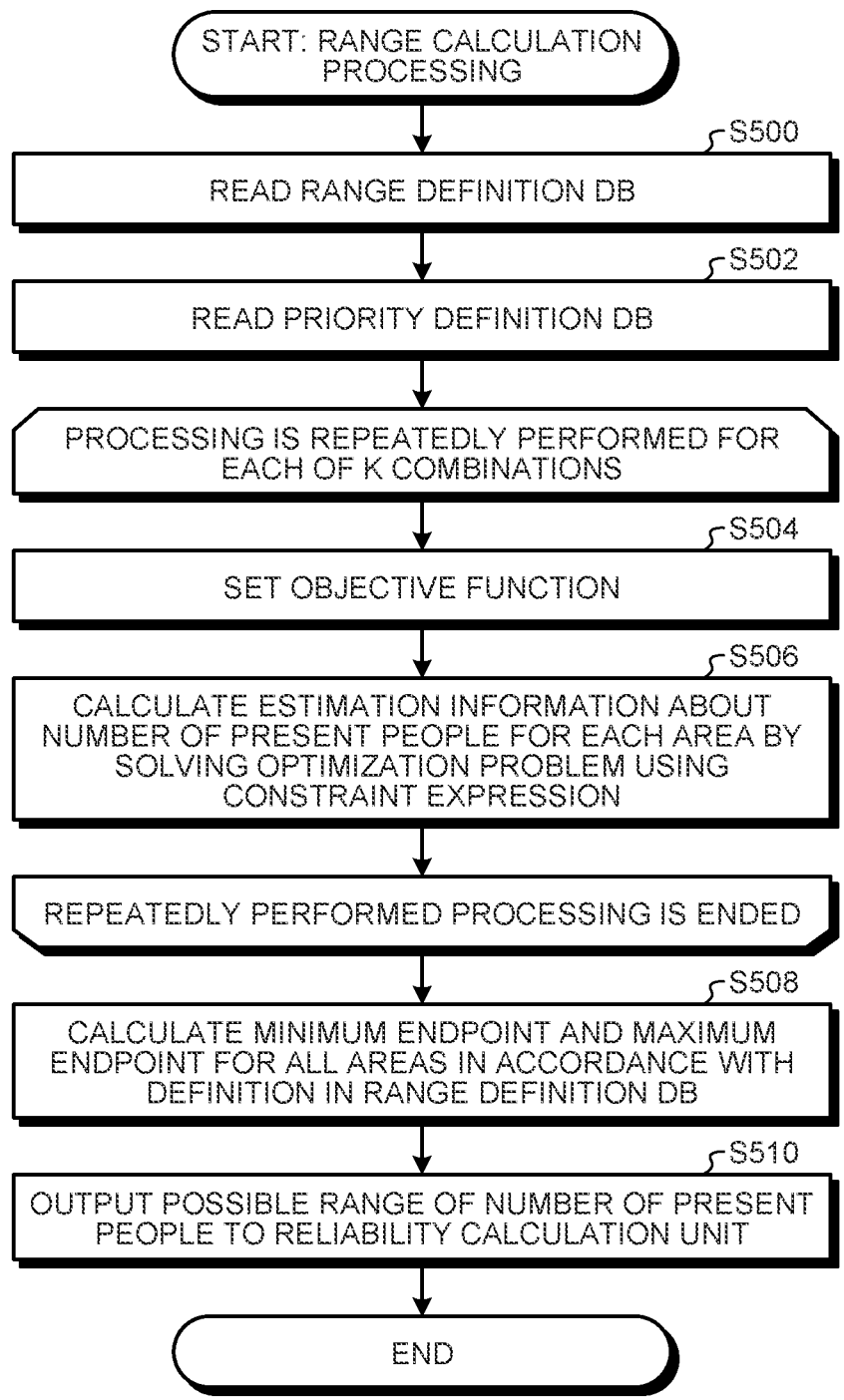
FIG. 17 is a flowchart illustrating a procedure of range calculation processing.

FIG. 17 is a flowchart illustrating an example of the procedure of the range calculation processing performed by the range calculation unit 21C.

The range calculation unit 20C reads the range definition DB 34 from the storage unit 30 (Step S500). The range calculation unit 20C also reads the priority definition DB 36 from the storage unit 30 (Step S502).

Next, for each of the areas EA included in the space MS as the observation target, the range calculation unit 20C performs the processing at Step S504 and Step S506 for each of the K combinations of the weight values specified in the priority definition DB 36 read at Step S502.

Specifically, the range calculation unit 20C sets the objective function represented by the expression (C) described above for each of the K combinations of the weight values specified in the weight definition table 36B of the priority definition DB 36 read at Step S502 (Step S504).

The range calculation unit 20C then obtains the estimation information about the number of present people for each of the areas EA by solving the mathematical optimization problem of the objective function set at Step S504 (Step S506). At this point, the range calculation unit 21C solves the mathematical optimization problem of the objective function using the constraint expression and the setting information derived by the derivation unit 20B as the constraint condition.

By repeatedly performing the processing at Step S504 to S506, the range calculation unit 20C calculates, for each of the areas EA included in the space MS as the observation target, the estimation information about the number of present people for each of the K combinations of the weight values specified in the priority definition DB 36.

Next, in accordance with the definition specified in the range definition DB 34 read at Step S502, the range calculation unit 20C calculates the maximum endpoint and the minimum endpoint of the number of present people using the estimation information about the number of present people calculated by the processing at Step S504 to Step S506 (Step S508). That is, the range calculation unit 21C calculates, for each of the areas EA, the possible range of the number of present people specified by the maximum endpoint and the minimum endpoint.

The range calculation unit 21C then outputs, to the reliability calculation unit 21D, the possible range of the number of present people specified by the maximum endpoint and the minimum endpoint (Step S510). This routine is then ended.

Next, the following describes an example of a procedure of the reliability calculation processing (refer to Step S106 in FIG. 10) performed by the reliability calculation unit 21D.

Figure 18:
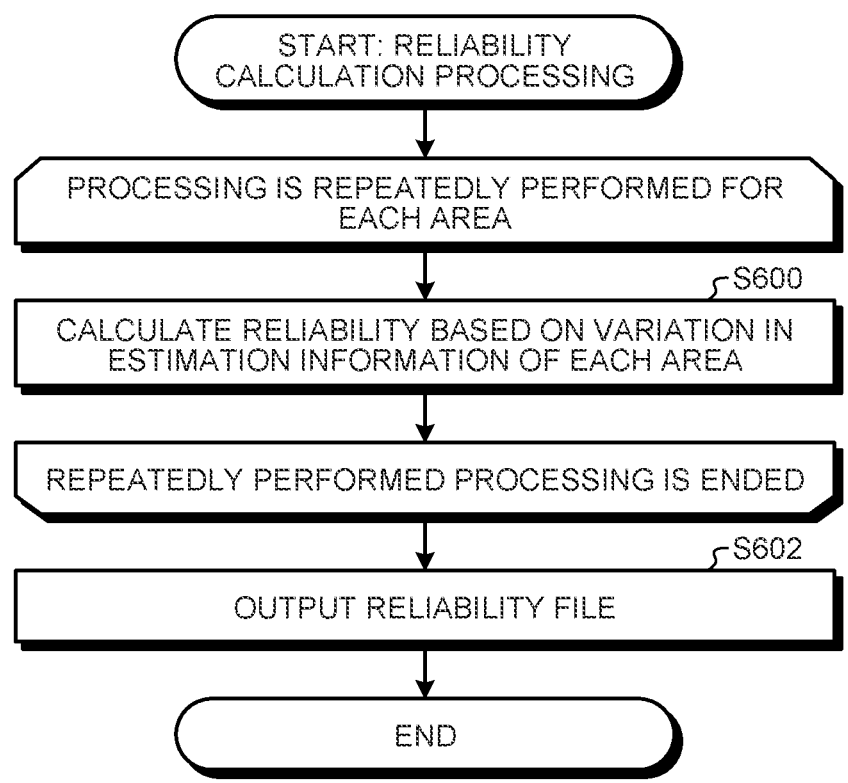
FIG. 18 is a flowchart illustrating a procedure of reliability calculation processing.

FIG. 18 is a flowchart illustrating an example of the procedure of the reliability calculation processing performed by the reliability calculation unit 21D. FIG. 18 exemplifies an example of the procedure of the processing in a case in which the reliability calculation unit 21D acquires the simulation table 38 as the possible range from the range calculation unit 20C.

The reliability calculation unit 21D performs processing at Step S600 for each of the areas EA included in the space MS as the observation target.

At Step S600, the reliability calculation unit 21D reads the variation in the estimation information as the estimation information about the number of present people obtained for each of the K combinations of the weight values corresponding to the area ID of the area EA for each of the areas EA specified by the simulation table 38.

The reliability calculation unit 21D then calculates, for each of the areas EA, a variance or a standard deviation representing the variation in the estimation information represented by pieces of the estimation information on the basis of the estimation information about the number of present people corresponding to each of the read K combinations of the weight values. The reliability calculation unit 21D then calculates the reliability using the calculated variance or standard deviation, and the expression (D) or the expression (E) described above.

The reliability calculation unit 21D then outputs the reliability file 44 in which a field of defining the reliability is added to the simulation table 38, and the reliability calculated at Step S600 is registered in the field (Step S602). This routine is then ended.

As described above, in the present embodiment, the range calculation unit 21C of the information processing device 10B obtains the estimation information about the number of present people for each of the areas EA by solving the mathematical optimization problem of the objective function that satisfies the constraint condition represented by the constraint expression, and is defined by the error term and the combination of the weight values corresponding to the combination of the groups to which the sensors S belong on the basis of the priority definition DB 36. The range calculation unit 21C then calculates the possible range of the number of present people using the estimation information about the number of present people obtained for each of the areas EA.

In this way, the information processing device 10B according to the present embodiment calculates the possible range of the number of present people in accordance with the priority represented by the combination of the weight values of the groups to which the sensors S belong.

That is, the information processing device 10B according to the present embodiment calculates the possible range of the number of present people on the basis of the weight values corresponding to the type and the like of the sensor S. Thus, the information processing device 10B according to the present embodiment can calculate the reliability with higher accuracy in addition to the effect of the embodiment described above.

First Modification

The above embodiments exemplify the form of using the error model directly specifying the variable X representing the number of present people in the observation unit space.

The information processing device 10 and the information processing device 10B according to the embodiments described above may use an error model representing the number of present people in the observation range of the sensor S represented by the variable X using an area ratio of the area EA included in the observation range of the sensor S.

In this case, the storage unit 30 may be configured to store an error model DB 33 illustrated in FIG. 19A to FIG. 19C in advance in place of the error model DB 32 described above.

FIG. 19A to FIG. 19C are schematic diagrams illustrating examples of a data configuration of the error model DB 33. For example, the error model DB 33 includes an area definition table 33B, an error term definition table 33C, and an error model definition table 33D.

FIG. 19A is a schematic diagram illustrating an example of a data configuration of the area definition table 33B. The area definition table 33B is a table defining the configuration of the variables X in the observation unit space included in the area EA, and the lower bound and the upper bound of the number of present people for each pf the areas EA included in the space MS as the observation target. The area ID, the lower bound, and the upper bound in the area definition table 33B are the same as those in the area definition table 32B in the embodiment described above.

In a field of a configuration of the variable X in the area definition table 33B, a variable An representing the number of present people in the area EA identified with a corresponding area ID is set. n is an integral number equal to or larger than 1, and identical with a number of the area ID. That is, in fields of the configuration in the area definition table 33B, a variable A1 to a variable A4 are set, which correspond to the areas EA1 to EA4, respectively.

FIG. 19B is a schematic diagram illustrating an example of a data configuration of the error term definition table 33C. The error term definition table 33C is the same as the error term definition table 32C according to the embodiment described above.

FIG. 19C is a schematic diagram illustrating an example of a data configuration of the error model definition table 33D. The error model definition table 33D is a table specifying a format of the constraint expression for each of the sensors S included in the space MS as the observation target similarly to the error model definition table 32D in the embodiment described above.

Specifically, the error model definition table 33D is a table in which the sensor ID, the observation value variable, the error model, the upper bound, and the lower bound are associated with each other. The sensor ID, the observation value variable, the lower bound, and the upper bound are the same as those in the error model definition table 32D in the embodiment described above.

The error model in the error model definition table 33D is a model representing the format of the constraint expression. Similarly to the embodiment described above, the error model is a model including the observation value variable of the observation value, and specifying a relation between the variable X and the error term related to the assumed detection error range of the sensor S for each of the sensor S. However, in the present embodiment, the error model in the error model definition table 33D is a model representing the number of present people in the observation range of the sensor S represented by the variable X using the area ratio of the area EA included in the observation range.

Specifically, as illustrated in FIG. 19C, a right side of an expression representing the error model represents the number of present people in the observation range of the sensor S represented by the variable X that represents the number of present people in the observation unit space using the variable An of the number of present people corresponding to the area ratio of the area EA included in the observation range of the sensor S.

That is, in the present modification, on the assumption that "distribution of the number of present people in the area EA is proportional to the area", the number of present people in the observation range of the sensor S is represented by the variable An of the number of present people corresponding to the area ratio of the area EA constituting the observation range of the sensor S.

The derivation unit 20B may derive the constraint expression similarly to the embodiment described above except that the error model DB 33 is used in place of the error model DB 32.

That is, the derivation unit 20B may derive the constraint expression by substituting the observation value acquired by the acquisition unit 20A for the term of the observation value variable included in the error model specified in the error model definition table 33D. The derivation unit 20B may derive the setting information similarly to the embodiment described above by using the error model DB 33 in place of the error model DB 32.

In this way, in the present modification, on the assumption that "distribution of the number of present people in the area EA is proportional to the area", used is the error model representing the number of present people in the observation range of the sensor S represented by the variable X using the area ratio of the area EA included in the observation range. Thus, in the present modification, the number of variables set for the mathematical optimization problem can be reduced as compared with the embodiment described above. Thus, in the present modification, the reliability of the estimation value of the number of present people can be calculated with a low load and high accuracy in addition to the effect of the embodiments described above.

Third Embodiment

The present embodiment describes a form of correcting the possible range of the number of present people in accordance with the estimation value of the number of present people calculated by the estimation unit 20E.

Figure 20:
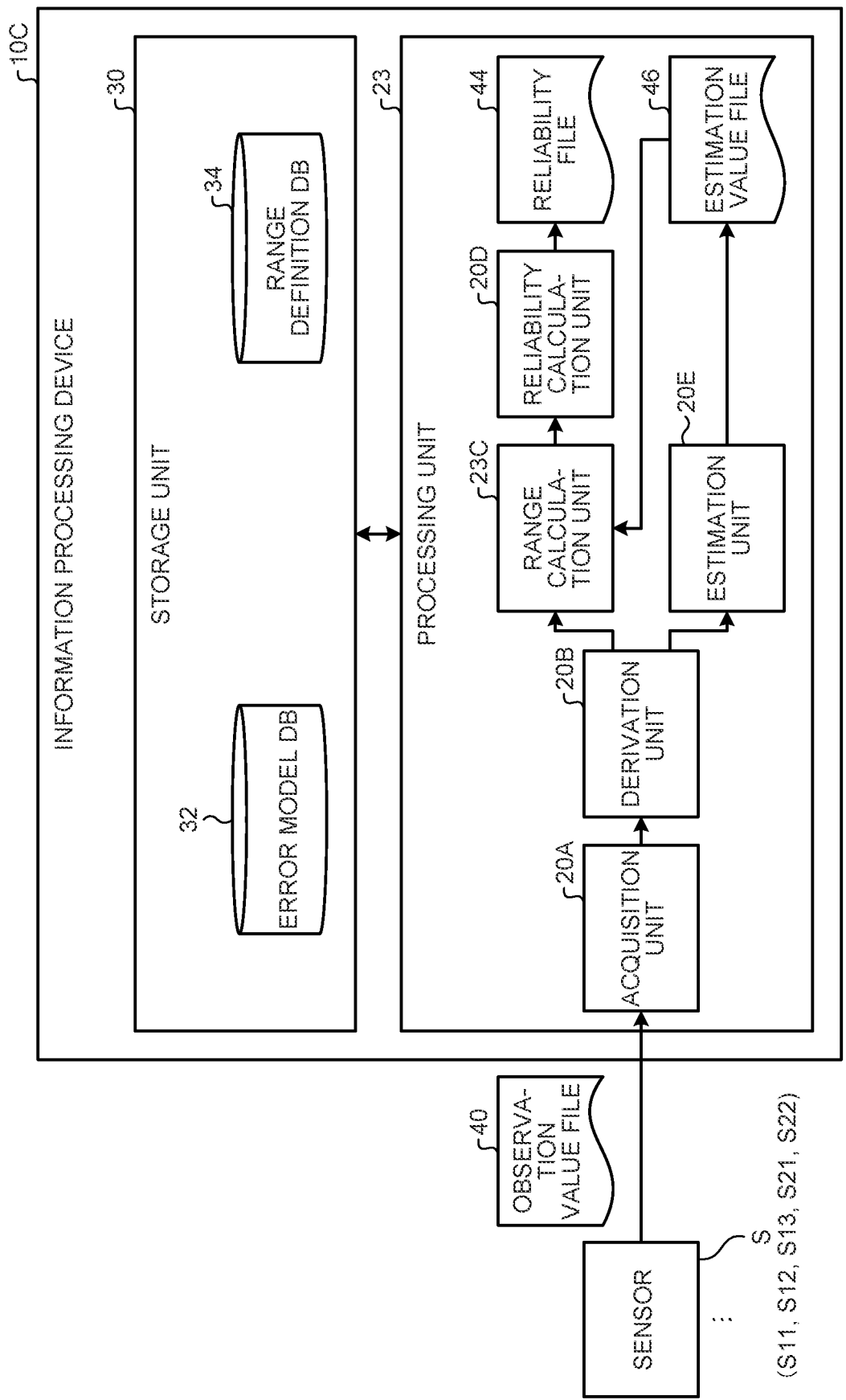
FIG. 20 is a schematic diagram of an information processing system.

FIG. 20 is a schematic diagram of an example of an information processing system 1C according to the present embodiment.

The information processing system 1C includes the sensor S and an information processing device 10C. The information processing device 10C and the sensor S are connected to each other in a communicable manner. The sensor S is the same as that in the embodiments described above.

The information processing device 10C includes a processing unit 23 and the storage unit 30. The processing unit 23 and the storage unit 30 are connected to each other in a communicable manner via a bus and the like. The storage unit 30 is the same as that in the first embodiment described above.

The processing unit 23 performs information processing in the information processing device 10C. The processing unit 23 includes the acquisition unit 20A, the derivation unit 20B, a range calculation unit 23C, the reliability calculation unit 20D, and the estimation unit 20E. The acquisition unit 20A, the derivation unit 20B, the reliability calculation unit 20D, and the estimation unit 20E are the same as those in the first embodiment described above.

Similarly to the range calculation unit 20C in the embodiment described above, the range calculation unit 23C calculates the possible range of the number of present people in the area EA using the constraint expression derived by the derivation unit 20B.

Moreover, in the present embodiment, the range calculation unit 23C acquires the estimation value of the number of present people estimated by the estimation unit 20E, and if the estimation value is out of the possible range, corrects the possible range by the estimation value.

Specifically, the range calculation unit 23C acquires the estimation value file 46 output from the estimation unit 20E. Similarly to the range calculation unit 20C in the embodiment described above, the range calculation unit 23C calculates a maximum value as a solution of the maximization problem of the number of present people in the area EA as a processing target using the constraint expression derived by the derivation unit 20B. Similarly to the range calculation unit 20C in the embodiment described above, the range calculation unit 23C also calculate a minimum value as a solution of the minimization problem of the number of present people in the area EA as a processing target using the constraint expression derived by the derivation unit 20B.

Furthermore, the range calculation unit 23C also performs correction processing for correcting each of the calculated maximum value and minimum value using the estimation value of the area EA as the processing target indicated by the estimation value file 46.

Specifically, in a case in which the estimation value of the area EA as the processing target indicated by the estimation value file 46 is out of a range from the minimum value as the solution of the minimization problem to the maximum value as the solution of the maximization problem, the range calculation unit 23C replaces at least one of the minimum value and the maximum value with the estimation value so that the estimation value is included in the range.

Specifically, in a case in which the estimation value of the area EA as the processing target indicated by the estimation value file 46 is smaller than the calculated minimum value as the solution of the minimization problem, the range calculation unit 23C replaces the minimum value with the estimation value. In a case in which the estimation value of the area EA as the processing target indicated by the estimation value file 46 is larger than the calculated maximum value as the solution of the maximization problem, the range calculation unit 23C replaces the maximum value with the estimation value.

Through this processing, the range calculation unit 23C corrects the maximum value and the minimum value that are obtained by solving the mathematical optimization problem using the estimation value of the number of present people estimated by the estimation unit 20E.

Note that, when the estimation value is a value within the range from the minimum value as the solution of the minimization problem to the maximum value as the solution of the maximization problem, each of the minimum value and the maximum value may be used as a corrected value.

By adjusting the corrected maximum value and minimum value in accordance with the definition specified in the range definition DB 34 similarly to the range calculation unit 20C in the embodiment described above, the range calculation unit 23C may calculate the maximum endpoint and the minimum endpoint of the possible range of the number of present people.

Next, the following describes an example of a procedure of information processing performed by the information processing device 10C according to the present embodiment.

Figure 21:
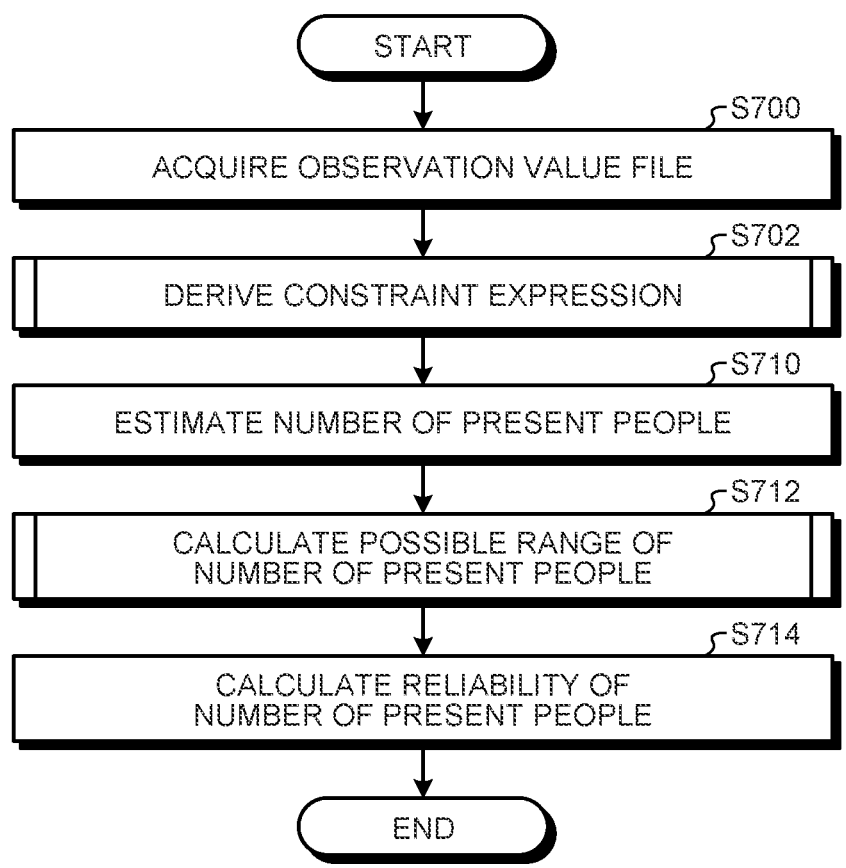
FIG. 21 is a flowchart illustrating a procedure of information processing.

FIG. 21 is a flowchart illustrating an example of the procedure of the information processing performed by the information processing device 10C according to the present embodiment.

The acquisition unit 20A of the information processing device 10C acquires the observation value file 40 from the sensor S (Step S700). The processing at Step S700 is the same as that at Step S100 described above (refer to FIG. 10).

Next, the derivation unit 20B performs constraint expression derivation processing for deriving the constraint expression for each of the areas EA on the basis of the observation value file 40 acquired at Step S700 (Step S702). The processing at Step PS702 is the same as that at Step S102 described above (refer to FIG. 10).

Next, the estimation unit 20E performs estimation processing for estimating the number of present people for each of the areas EA on the basis of the observation value file acquired at Step S700 (Step S710). The processing at Step S710 is the same as that at Step S108 described above (refer to FIG. 10).

Next, the range calculation unit 23C performs range calculation processing for calculating the possible range of the number of present people for each of the areas EA by using the constraint expression derived at Step S702 and the estimation value file 46 estimated at Step S710 (Step S712). Details about the processing at Step S712 will be described later.

Next, the reliability calculation unit 20D calculates the reliability of the estimation value of the number of present people for each of the areas EA by using the possible range of the number of present people calculated at Step S712 (Step S714). The processing at Step S714 is the same as that at Step S106 described above (refer to FIG. 10). This routine is then ended.

Next, the following describes an example of a procedure of the range calculation processing (refer to Step S712 in FIG. 21) performed by the range calculation unit 23C of the information processing device 10C according to the present embodiment.

Figure 22:
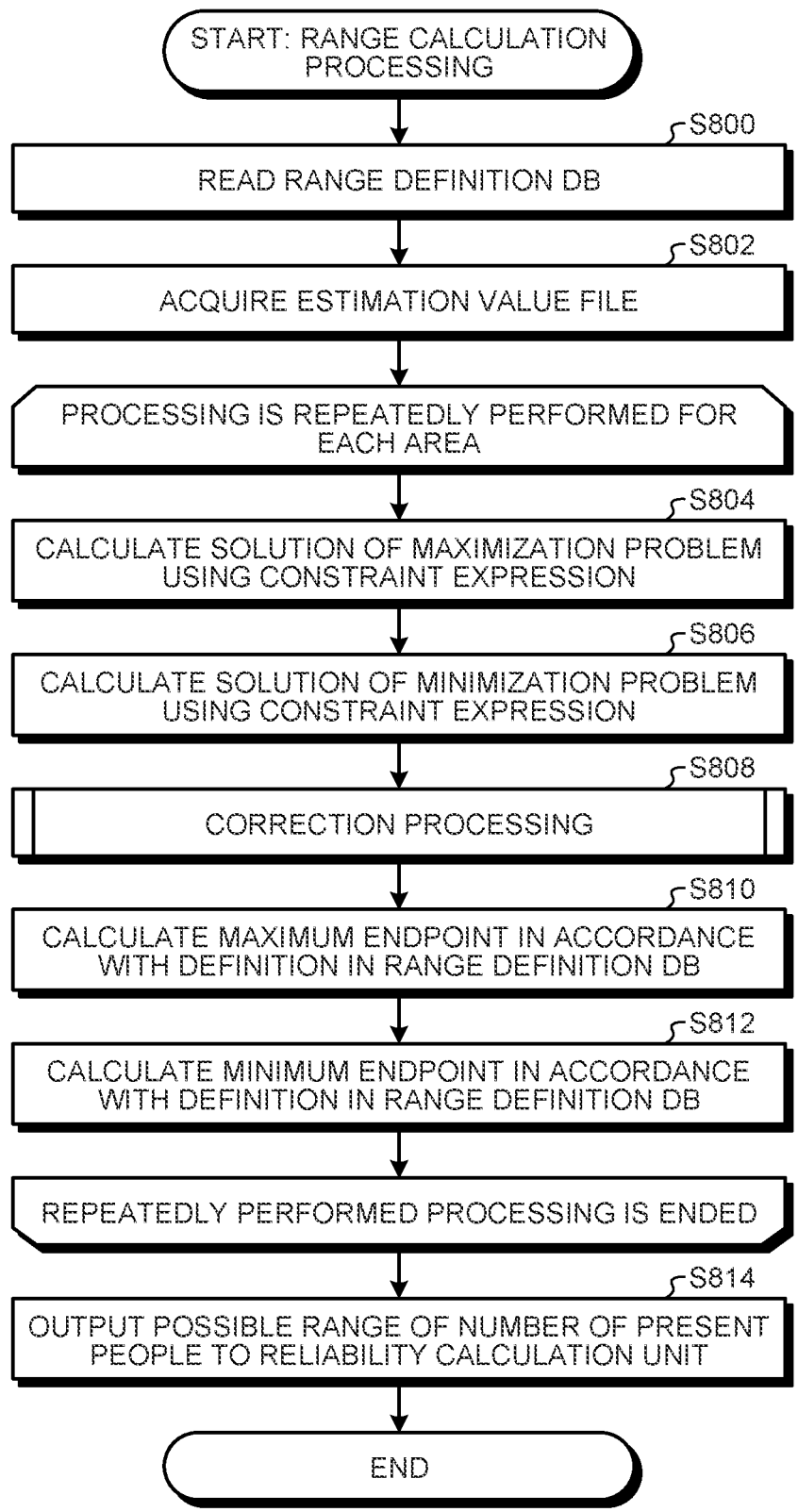
FIG. 22 is a flowchart illustrating a procedure of range calculation processing.

FIG. 22 is a flowchart illustrating an example of the procedure of the range calculation processing performed by the range calculation unit 23C.

The range calculation unit 23C reads the range definition DB 34 from the storage unit 30 (Step S800). The range calculation unit 23C also acquires the estimation value file 46 from the estimation unit 20E (Step S802).

Next, the range calculation unit 23C repeatedly performs the processing at Step S804 to Step S812 for each of the areas EA included in the space MS as the observation target.

Specifically, the range calculation unit 23C calculates the maximum value as the solution of the maximization problem of the number of present people in the area EA as the processing target using the constraint expression derived by the derivation unit 20B (Step S804). The range calculation unit 23C also calculates the minimum value as the solution of the minimization problem of the number of present people in the area EA as the processing target using the constraint expression derived by the derivation unit 20B (Step S806). Pieces of the processing at Step S804 and Step S806 are the same as those at Step S302 and Step S304 described above (refer to FIG. 12).

Moreover, the range calculation unit 23C performs correction processing for correcting each of the maximum value and the minimum value calculated at Step S804 and Step S806 using the estimation value of the area EA as the processing target indicated by the estimation value file 46 (Step S808).

Figure 23:
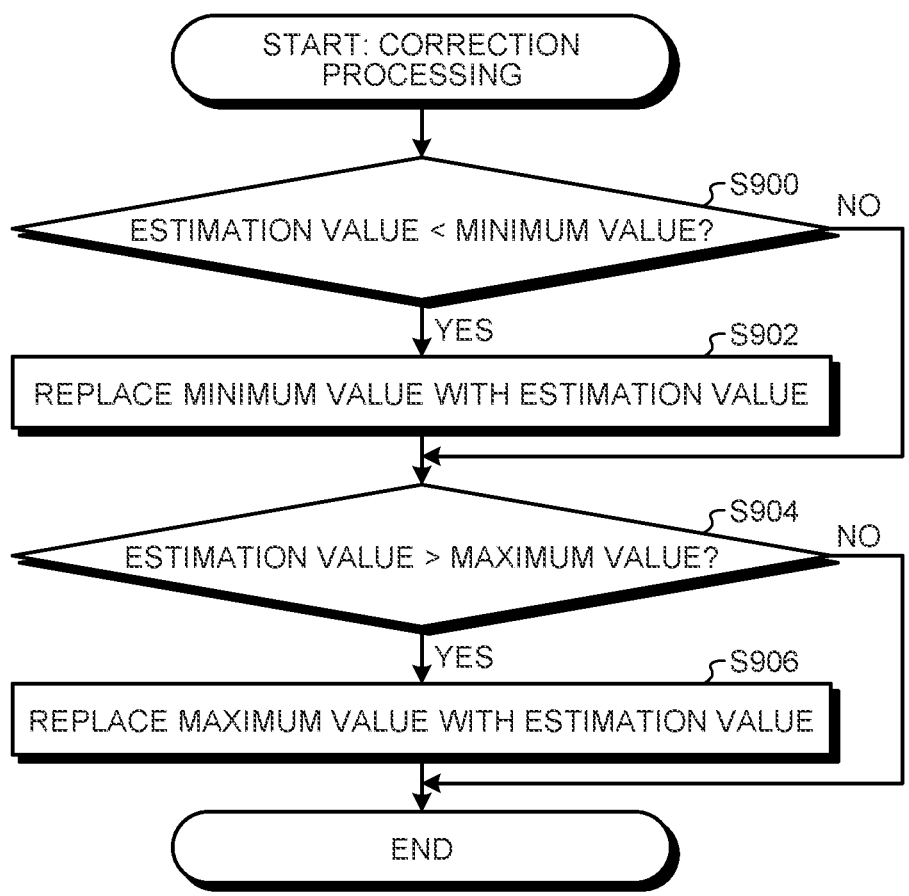
FIG. 23 is a flowchart illustrating a procedure of correction processing.

FIG. 23 is a flowchart illustrating an example of a procedure of correction processing at Step S808 (refer to FIG. 22).

The range calculation unit 23C determines whether the estimation value of the number of present people in the area EA as the processing target indicated by the estimation value file 46 acquired at Step S802 is smaller than the minimum value as the solution of the minimization problem calculated at Step S806 (Step S900). If negative determination is made at Step S900 (No at Step S900), the process proceeds to Step S904 described later. If positive determination is made at Step S900 (Yes at Step S900), the process proceeds to Step S902.

At Step S902, the minimum value as the solution of the minimization problem calculated at Step S806 is replaced with the estimation value of the number of present people in the area EA as the processing target indicated by the estimation value file 46 acquired at Step S802 (Step S902).

Next, the range calculation unit 23C determines whether the estimation value of the number of present people in the area EA as the processing target indicated by the estimation value file 46 acquired at Step S802 is larger than the maximum value as the solution of the maximization problem calculated at Step S804 (Step S904). If negative determination is made at Step S904 (No at Step S904), this routine is ended. If positive determination is made at Step S904 (Yes at Step S904), the process proceeds to Step S906.

At Step S906, the maximum value as the solution of the maximization problem calculated at Step S804 is replaced with the estimation value of the number of present people in the area EA as the processing target indicated by the estimation value file 46 acquired at Step S802 (Step S906). This routine is then ended.

Note that, when the minimum value as the solution of the minimization problem is equal to or smaller than the estimation value, and the maximum value as the solution of the maximization problem is equal to or larger than the estimation value, each of the maximum value and the minimum value as calculated solutions may be used as a corrected value.

Returning to FIG. 22, the description will be continued. Next, by using the maximum value subjected to the correction processing at Step S808 and the definition of the maximum endpoint specified in the range definition DB 34, the range calculation unit 23C derives the maximum endpoint of the possible range of the number of present people in accordance with the definition (Step S810). Additionally, by using the minimum value subjected to the correction processing at Step S808 and the definition of the minimum endpoint specified in the range definition DB 34, the range calculation unit 23C derives the minimum endpoint of the possible range of the number of present people in accordance with the definition (Step S812).

After performing the processing at Step S804 to Step S812 for each of the areas EA included in the space MS as the observation target, the range calculation unit 23C advances the process to Step S814. At Step S814, the range calculation unit 23C outputs, to the reliability calculation unit 20D, the possible range of the number of present people in each of all the areas EA included in the space MS as the observation target derived by repeatedly performing the processing at Step S804 to Step S812 (Step S814). This routine is then ended.

As described above, in the information processing device 10C according to the present embodiment, the range calculation unit 23C acquires the estimation value of the number of present people estimated by the estimation unit 20E, and if the estimation value is out of the possible range of the number of present people calculated by the range calculation unit 23C, corrects the possible range by the estimation value.

Therefore, the information processing device 10C according to the present embodiment can calculate the reliability of the estimation value of the number of present people in the area EA with higher accuracy in addition to the effect of the embodiment described above.

Second Modification

The above embodiments exemplify the form of using the error model directly specifying the variable X representing the number of present people in the observation unit space.

An error model using an integrated variable, which is obtained by integrating at least part of the variables X of the observation unit spaces included in the observation space of the sensor S, may be used.

In a case in which there is linear dependence among the variables X of some of the observation unit spaces included in the observation space of the sensor S, a value of the solution may vary depending on a solution method for mathematical optimization. Specifically, with a solution method of searching a solution space from an end thereof such as a barrier method, values are biased to any one of the variables X among which linear dependence is present, and all other values become 0. However, with a solution method of searching the solution space from a middle point thereof such as a primal-dual interior point method, values are equally distributed to the variables X among which linear dependence is present. Thus, there is the problem that a total value of solutions of the variables X among which linear dependence is present is the same, but respective solutions of the variables X among which linear dependence is present are different depending on the solution method for mathematical optimization.

Figure 24:
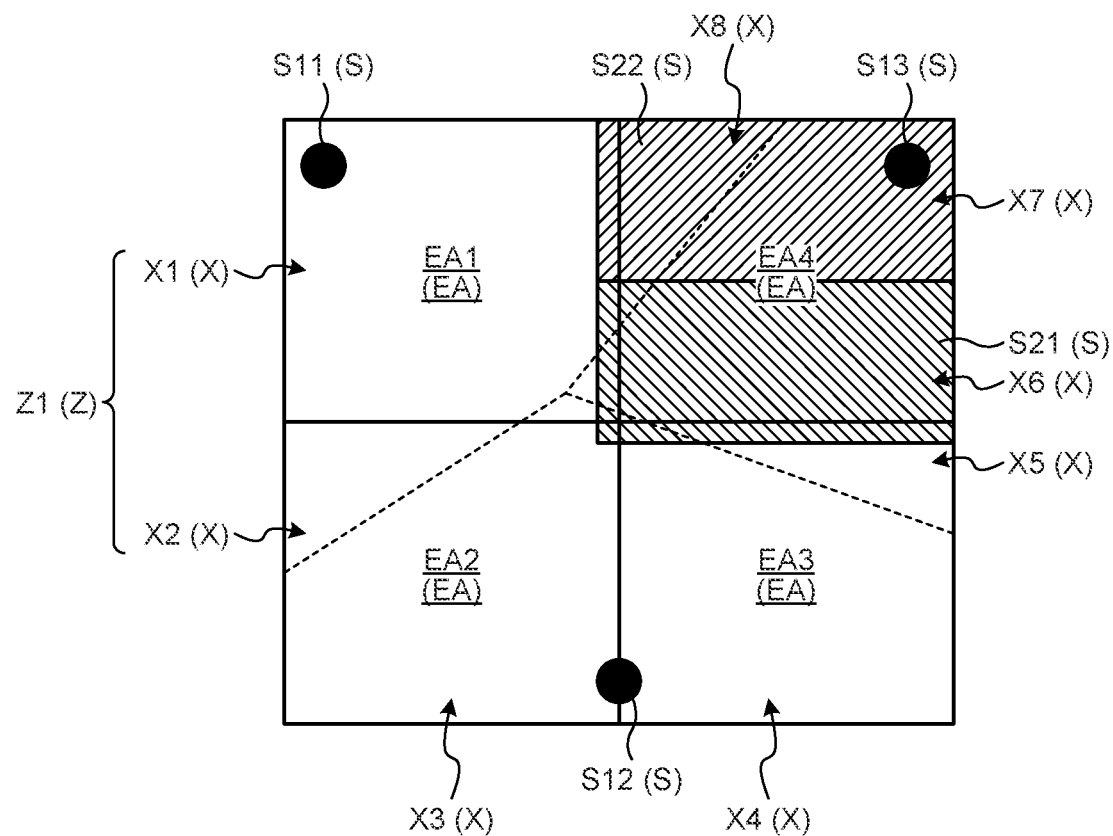
FIG. 24 is an explanatory diagram of an integrated variable.

FIG. 24 is an explanatory diagram of an example of an integrated variable Z. FIG. 24 illustrates a schematic diagram of the space MS as the observation target that is the same as that in the embodiment described above. FIG. 24 assumes a case in which the variable X1 and the variable X2 of the respective observation unit spaces present in the observation space of the sensor S11 are integrated to be treated as an integrated variable Z1. The integrated variable Z1 is an example of the integrated variable Z.

The observation unit space of the variable X1 and the observation unit space of the variable X2 are spaces that are present within the observation space of the sensor S11 and adjacent to each other in the observation space. In the present modification, among the observation unit spaces present within the observation space of at least one of the sensors S, the variables X of adjacent observation unit spaces are integrated and treated as the integrated variable Z. Specifically, as an example of the variables X among which linear dependence is present, at least two variables X, the sensor IDs of which including the observation unit spaces of the variables are completely identical with each other, are integrated to be one variable (integrated variable Z).

In this case, the storage unit 30 may be configured to store an error model DB 35 illustrated in FIG. 25A to FIG. 25C in advance in place of the error model DB 32 described above.

FIG. 25A to FIG. 25C are schematic diagrams illustrating an example of a data configuration of the error model DB 35. For example, the error model DB 35 includes a variable definition table 35A, an area definition table 32B, an error term definition table 32C, an integrated variable definition table 35E, and an error model definition table 35D. The area definition table 32B and the error term definition table 32C are the same as those in the embodiment described above, so that they are not illustrated again.

FIG. 25A is a schematic diagram illustrating an example of a data configuration of the variable definition table 35A. The variable definition table 35A is a table in which a variable name, a lower bound, an upper bound, and a ratio of each of the observation unit spaces included in the space MS as the observation target are associated with each other.

The variable name, the lower bound, and the upper bound in the variable definition table 35A are the same as the variable name, the lower bound, and the upper bound in the variable definition table 32A described in the above embodiment (refer to FIG. 5A).

The ratio is information representing a distribution ratio at the time of distributing a range of the number of present people that is calculated for each observation range of the sensor S using the integrated variable Z to each of the observation unit spaces corresponding to the variable X included in the integrated variable Z. As the ratio, used are an area ratio, a statistical ratio of the number of present people in the past, a ratio on the basis of an empirical rule, and the like. FIG. 25A exemplifies a form of using the area ratio as the ratio.

FIG. 25B is a schematic diagram illustrating an example of a data configuration of the integrated variable definition table 35E. The integrated variable definition table 35E is a table specifying a definition of the integrated variable Z. Specifically, the integrated variable definition table 35E is a table in which an integrated variable name, a lower bound, an upper bound, and a configuration variable are associated with each other.

The integrated variable name is identification information for the integrated variable Z included in the space MS as the observation target. FIG. 25A exemplifies Z1 as a name of the integrated variable Z1. The lower bound in the integrated variable definition table 35E represents a lower limit value of the number of present people represented by the integrated variable Z identified with a corresponding integrated variable name. The upper bound in the integrated variable definition table 35E represents an upper limit value of the number of present people represented by the integrated variable Z identified with a corresponding integrated variable name.

As the lower bound and the upper bound in the integrated variable definition table 35E, an added value of lower bounds of the variables X before integration and an added value of upper bounds of the variables X before integration may be respectively set. The lower bound in the integrated variable definition table 35E may be "NA" in a case in which "NA" is set to the lower bounds of the variables X before integration. The upper bound in the integrated variable definition table 35E may be "NA" in a case in which "NA" is set to the upper bounds of the variables X before integration.

The configuration variable in the integrated variable definition table 35E refers to a configuration of the variables X included in the integrated variable Z identified with a corresponding integrated variable name. As described above, the integrated variable Z1 is the integrated variable Z including the variable X1 and the variable X2. Thus, in the integrated variable definition table 35E, "X1, X2" are set in advance as configuration variables corresponding to the integrated variable name "Z1".

FIG. 25C is a schematic diagram illustrating an example of a data configuration of the error model definition table 35D. The error model definition table 35D is a table specifying a format of the constraint expression for each of the sensors S included in the space MS as the observation target similarly to the error model definition table 32D according to the embodiment described above.

Specifically, the error model definition table 35D is a table in which the sensor ID, the observation value variable, the error model, the upper bound, and the lower bound are associated with each other. The sensor ID, the observation value variable, the lower bound, and the upper bound are the same as those in the error model definition table 32D in the embodiment described above.

The error model in the error model definition table 35D is a model representing the format of the constraint expression. Similarly to the embodiment described above, the error model is a model including the observation value variable of the observation value, and specifying a relation between the variable X and the error term related to the assumed detection error range of the sensor S for each of the sensor S. However, in the present embodiment, the error model in the error model definition table 35D is an error model using the integrated variable Z obtained by integrating at least part of the variables X of the observation unit spaces included in the observation space of the sensor S.

Specifically, for example, as described above, the present modification assumes a case in which the variable X1 and the variable X2 of the respective observation unit spaces present in the observation space of the sensor S11 are integrated to be treated as the integrated variable Z1. Thus, a portion representing addition of the variable X1 and the variable X2 in the error model definition table 35D is represented by the integrated variable Z1.

In this case, the derivation unit 20B may derive the constraint expression by substituting the observation value acquired by the acquisition unit 20A for the term of the observation value variable included in the error model using the error model set in the error model definition table 35D. That is, the derivation unit 20B may derive the constraint expression similarly to the embodiment described above except that the error model set in the error model definition table 35D is used in place of the error model set in the error model definition table 32D.

Through this constraint expression derivation processing, the derivation unit 20B describes the constraint expression using, as the variable, the integrated variable Z obtained by integrating at least part of the variables X of the observation unit spaces included in the observation range of the sensor S.

Each of the range calculation unit 20C in the first embodiment and the range calculation unit 21C in the second embodiment calculates the range of the number of present people for each observation range of the sensor S using the constraint expression derived by the derivation unit 20B. Each of the range calculation unit 20C and the range calculation unit 21C then calculates the possible range of the number of present people in the area EA by distributing the calculated range of the number of present people to each of the observation unit spaces using area ratios of the observation unit spaces included in the observation range of the sensor S.

Specifically, the range calculation unit 20C calculates the possible range of the number of present people in the area EA through the following processing.

Figure 26:
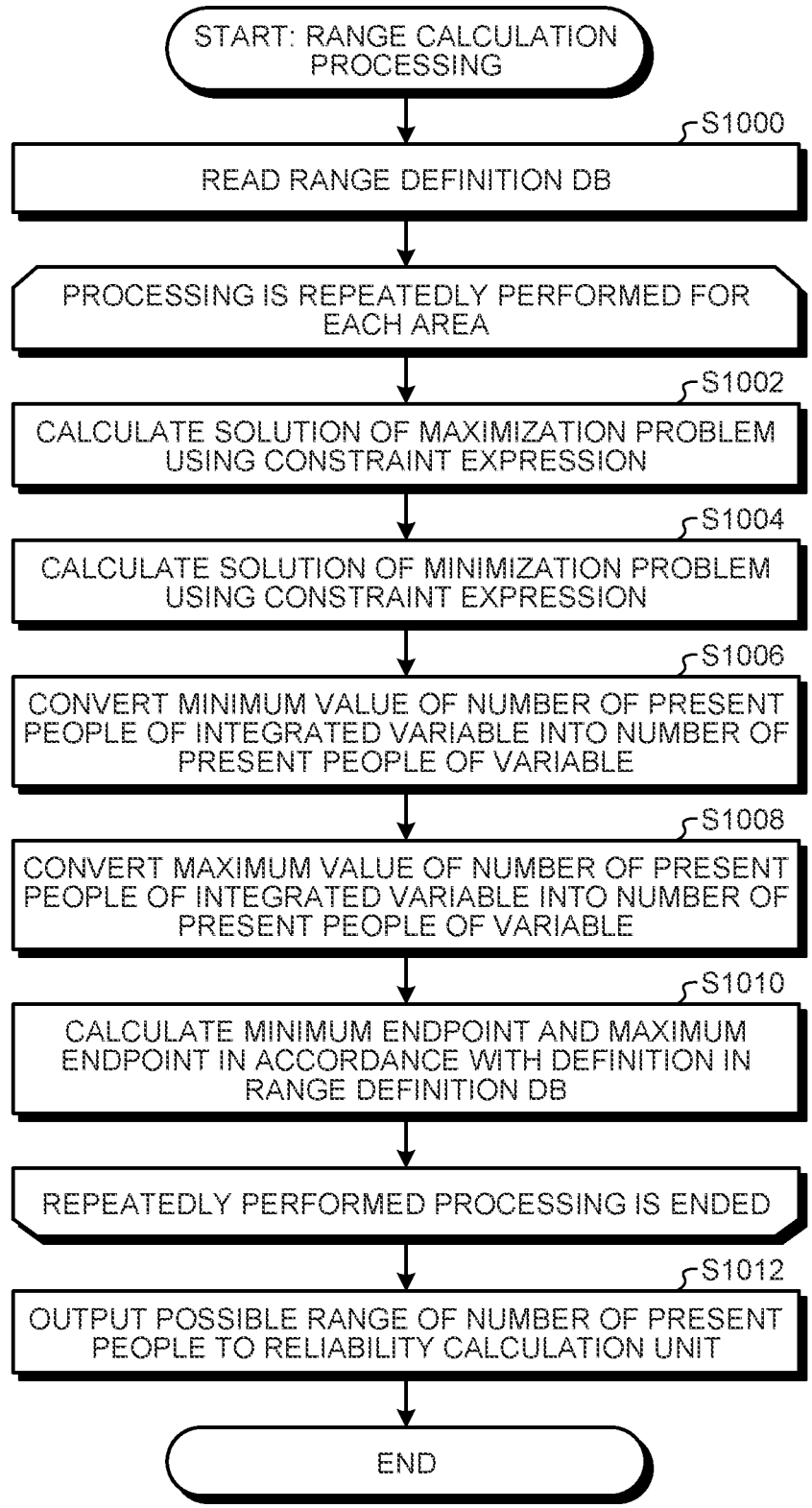
FIG. 26 is a flowchart illustrating a procedure of range calculation processing.

FIG. 26 is a flowchart illustrating an example of the procedure of the range calculation processing performed by the range calculation unit 20C.

The range calculation unit 20C reads the range definition DB 34 from the storage unit 30 (Step S1000).

Next, the range calculation unit 20C performs the processing at Step S1002 to Step S1010 for each of the areas EA included in the space MS as the observation target.

Specifically, the range calculation unit 20C calculates a solution of the maximization problem of the number of present people in the area EA as a processing target using the constraint expression derived by the derivation unit 20B (Step S1002). The range calculation unit 20C also calculates a solution of the minimization problem of the number of present people in the area EA as a processing target using the constraint expression derived by the derivation unit 20B (Step S1004). Pieces of the processing at Step S1002 and Step S1004 are the same as those at Step S302 and Step S304 in the first embodiment described above (refer to FIG. 12).

Next, the range calculation unit 20C converts the minimum value of the number of present people of the integrated variable Z as the solution calculated at Step S1004 into the number of present people of the variable X before integration (Step S1006).

The range calculation unit 20C also converts the maximum value of the number of present people of the integrated variable Z as the solution calculated at Step S1002 into the number of present people of the variable X before integration (Step S1008).

At Step S1006 and Step S1008, the range calculation unit 20C specifies the variables X before integration of the integrated variable Z by reading configuration variables corresponding to the integrated variable name of the integrated variable Z from the integrated variable definition table 35E. For example, assumed is a case in which the integrated variable definition table 35E illustrated in FIG. 25B is stored in the storage unit 30. In this case, the range calculation unit 20C specifies the variable X1 and the variable X2 as the variables X before integration of the integrated variable Z1.

The range calculation unit 20C then converts the integrated variable Z into the number of present people represented by the variable X before integration using the following expression (F).

The number of present people represented by the variable $X$ before integration=ratio of the variable $X$ before integration/$\Sigma$(ratio of the variable $X$)×solution of the integrated variable $Z$  (F)

In the expression (F), the ratio represents a ratio corresponding to the variable name of the variable X as a processing target set in the variable definition table 35A.

The range calculation unit 20C then calculates the maximum endpoint and the minimum endpoint of the possible range of the number of present people in accordance with the minimum value after conversion at Step S1006, the maximum value after conversion at Step S1008, and the endpoint definition specified in the range definition DB 34 (Step S1010). The processing at Step S1010 is the same as that at the Step S306 and the Step S308 described in the first embodiment (refer to FIG. 12).

After performing the processing at Step S1002 to Step S1010 for each of the areas EA included in the space MS as the observation target, the range calculation unit 20C advances the process to Step S1012. At Step S1012, the range calculation unit 20C outputs, to the reliability calculation unit 20D, the possible range of the number of present people in each of all the areas EA included in the space MS as the observation target derived by repeatedly performing the processing at Step S1002 to Step S1010 (Step S1012). This routine is then ended.

Next, the following describes a procedure of range calculation processing performed by the range calculation unit 21C according to the second embodiment using the constraint expression according to the present modification.

Figure 27:
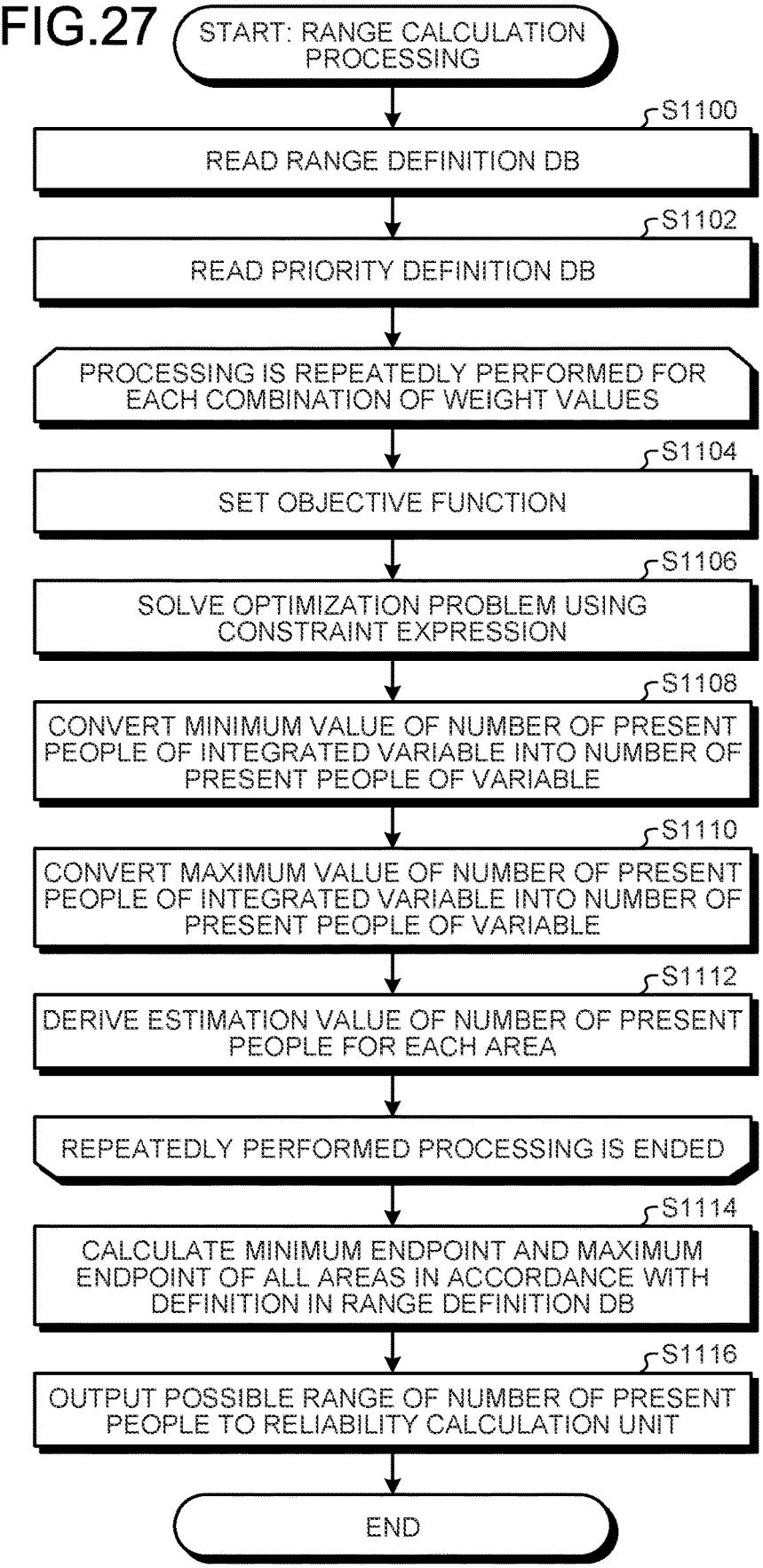
FIG. 27 is a flowchart illustrating a procedure of range calculation processing.

FIG. 27 is a flowchart illustrating an example of the procedure of the range calculation processing performed by the range calculation unit 21C.

The range calculation unit 21C reads the range definition DB 34 from the storage unit 30 (Step S1100). The range calculation unit 21C also reads the priority definition DB 36 from the storage unit 30 (Step S1102).

Next, for each of the areas EA included in the space MS as the observation target, the range calculation unit 21C performs the processing at Step S1104 to Step S1112 for each of the K combinations specified in the priority definition DB 36 read at Step S1102.

Specifically, the range calculation unit 21C sets the objective function represented by the expression (C) described above for each of the K combinations of the weight values specified in the weight definition table 36B of the priority definition DB 36 read at Step S1102 (Step S1104).

The range calculation unit 21C then solves a mathematical optimization problem of the objective function set at Step S1104 (Step S1106). Pieces of the processing at Step S1100 to Step S1106 are the same as those at Step S500 to Step S506 in the second embodiment described above (refer to FIG. 17).

Next, the range calculation unit 21C converts the minimum value of the number of present people of the integrated variable Z as the solution calculated at Step S1106 into the number of present people of the variable X before integration (Step S1108). The range calculation unit 21C also converts the maximum value of the number of present people of the integrated variable Z as the solution calculated at Step S1106 into the number of present people of the variable X before integration (Step S1110).

The range calculation unit 21C may perform the processing at Step S1108 and Step S1110 similarly to Step S1006 and Step S1008 described above (refer to FIG. 26).

The range calculation unit 21C then derives the estimation value of the number of present people for each of the areas EA using solutions of the variables X converted at Step S1108 and Step S1110 (Step S1112).

By repeatedly performing the processing at Step S1104 to S1112, the range calculation unit 21C calculates, for each of the areas EA included in the space MS as the observation target, the estimation value of the number of present people for each of the K combinations specified in the priority definition DB 36.

Next, in accordance with the definition specified in the range definition DB 34 read at Step S1110, the range calculation unit 21C calculates the maximum endpoint and the minimum endpoint of the number of present people using the estimation value of the number of present people calculated by the processing at Step S1104 to Step S1112 (Step S1114). That is, the range calculation unit 21C calculates, for each of the areas EA, the possible range of the number of present people specified by the maximum endpoint and the minimum endpoint.

The range calculation unit 21C then outputs, to the reliability calculation unit 21D, the possible range of the number of present people specified by the maximum endpoint and the minimum endpoint (Step S1116). This routine is then ended.

As described above, the present modification uses the integrated variable Z obtained by integrating at least part of the variables X of the observation unit spaces included in the observation space of the sensor S.

Therefore, in the present modification, the reliability of the estimation value of the number of present people in the area EA can be calculated with a low load and at high speed in addition to the effect of the embodiments described above. According to the present modification, it is possible to prevent the solutions of the variables having linear dependence from being different from each other due to a difference in the solution method used for mathematical optimization.

Next, the following describes an example of hardware configurations of the information processing device 10, the information processing device 10B, and the information processing device 10C according to the embodiments described above.

Figure 28:
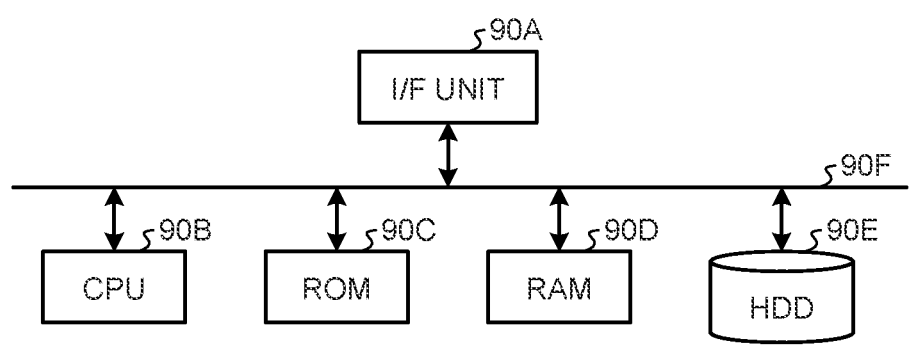
FIG. 28 is a hardware configuration diagram.

FIG. 28 is a hardware configuration diagram as an example of the information processing device 10, the information processing device 10B, and the information processing device 10C according to the embodiments described above.

Each of the information processing device 10, the information processing device 10B, and the information processing device 10C according to the embodiments described above has a hardware configuration including a control device such as a central processing unit (CPU) 90B, storage devices such as a read only memory (ROM) 90C, a random access memory (RAM) 90D, and a hard disk drive (HDD) 90E, an I/F unit 90A as an interface with various appliances, and a bus 90F that connects respective parts with each other, and utilizing a typical computer.

In each of the information processing device 10, the information processing device 10B, and the information processing device 10C according to the embodiments described above, the respective parts are implemented on the computer when the CPU 90B reads out a computer program from the ROM 90C onto the RAM 90D, and executes the computer program.

The computer program for performing the pieces of processing described above executed by the information processing device 10, the information processing device 10B, and the information processing device 10C according to the embodiments described above may be stored in the HDD 90E. The computer program for performing the pieces of processing described above executed by the information processing device 10, the information processing device 10B, and the information processing device 10C according to the embodiments described above may be embedded and provided in the ROM 90C.

The computer program for performing the pieces of processing described above executed by the information processing device 10, the information processing device 10B, and the information processing device 10C according to the embodiments described above may be stored in a computer-readable storage medium such as a CD-ROM, a CD-R, a memory card, a Digital Versatile Disc (DVD), and a flexible disk (FD), as an installable or executable file, and provided as a computer program product. The computer program for performing the pieces of processing described above executed by the information processing device 10, the information processing device 10B, and the information processing device 10C according to the embodiments described above may be stored in a computer connected to a network such as the Internet and provided by being downloaded via the network. Furthermore, the computer program for performing the pieces of processing described above executed by the information processing device 10, the information processing device 10B, and the information processing device 10C according to the embodiments described above may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
one or more hardware processors configured to function as:
a derivation unit to derive a constraint expression obtained by substituting an observation value for a term of an observation value variable included in an error model, the observation value being an observation value of a number of first present objects observed by one or more sensors disposed in at least part of one or more areas, deriving of the constraint expression being performed for each of the one or more sensors, the error model representing correspondence between
a number of second present objects in a first observation range of the sensor represented by the observation value variable of the observation value and an error term related to an assumed detection error range of the sensor, and
a number of third present objects in a second observation range of the sensor represented by a variable indicating a number of fourth present objects in an observation unit space determined based on the second observation range of the sensor and a range of each of the one or more areas;
a range calculation unit to calculate a possible range of a number of fifth present objects in each of the one or more areas by using the constraint expression; and
a reliability calculation unit to calculate, by using the possible range, reliability of an estimation value of the number of the fifth present objects for each of the one or more areas without using the estimation value.

2. The information processing device according to claim 1, wherein the one or more hardware processors are further configured to function as an acquisition unit to acquire the observation value from the sensor.

3. The information processing device according to claim 2, wherein the derivation unit derives, for each of the one or more sensors, the constraint expression obtained by substituting an acquired observation value for the term of the observation value variable included in the error model representing the number of the third present objects in the second observation range of the sensor represented by the variable using an area ratio of the area included in the second observation range.

4. The information processing device according to claim 1, wherein the one or more hardware processors are further configured to function as an estimation unit to estimate the number of the fifth present objects in each of the one or more areas based on the observation value.

5. The information processing device according to claim 4, wherein the range calculation unit corrects the possible range by the estimation value in a case where an estimation value of the number of the fifth present objects estimated by the estimation unit is out of the possible range.

6. The information processing device according to claim 1, wherein the range calculation unit calculates the possible range of the number of the fifth present objects in each of the one or more areas by using the constraint expression and setting information, the setting information including a lower bound and/or an upper bound of at least one of the variable, the number of the fifth present objects that are able to be present in the area, the error term, and a number of sixth present objects that are able to be observed by the sensor.

7. The information processing device according to claim 6, wherein the range calculation unit
obtains estimation information about the number of the fifth present objects in each of the one or more areas by solving, based on priority definition information in which a combination of weight values is specified for each combination of groups to which the one or more sensors belong, a mathematical optimization problem of an objective function that satisfies a constraint condition represented by the constraint expression and is specified by the error term and the combination of the weight values, and
calculates the possible range by using the estimation information.

8. The information processing device according to claim 7, wherein the range calculation unit calculates variation of the estimation value as the possible range.

9. The information processing device according to claim 6, wherein the number of the first present objects through the number of the sixth present objects are each a number of present people.

10. The information processing device according to claim 1, wherein the range calculation unit calculates endpoints of the possible range of the number of the fifth present objects in each of the one or more areas by solving a mathematical optimization problem of an objective function that satisfies a constraint condition represented by the constraint expression, the objective function being represented by a configuration of the variable of the observation unit space included in the area.

11. The information processing device according to claim 4, wherein the range calculation unit calculates, as the endpoint of the possible range, a value obtained by correcting a solution obtained by solving the mathematical optimization problem based on an endpoint definition determined in advance.

12. The information processing device according to claim 1, wherein the reliability calculation unit calculates, as the reliability, an inverse number of a difference between a maximum endpoint and a minimum endpoint of the possible range.

13. The information processing device according to claim 1, wherein the reliability calculation unit calculates, as the reliability, a value proportional to a difference between a maximum endpoint and a minimum endpoint of the possible range.

14. The information processing device according to claim 1, wherein
the derivation unit describes the constraint expression in which the variable indicates an integrated variable obtained by integrating at least part of variables of observation unit spaces included in the second observation range of the sensor, and
the range calculation unit
calculates a range of the number of the third present objects for the second observation range of the sensor by using the constraint expression, and
calculates the possible range of the number of the fifth present objects in the area by distributing the calculated range of the number of the fifth present objects to each of observation unit spaces by using area ratios of the observation unit spaces included in the second observation range.

15. The information processing device according to claim 14, wherein the variables integrated as the integrated variable are variables whose observation unit spaces are present in an observation space of a same sensor.

16. An information processing method comprising:
deriving a constraint expression obtained by substituting an observation value for a term of an observation value variable included in an error model, the observation value being an observation value of a number of first present objects observed by one or more sensors disposed in at least part of one or more areas, the deriving of the constraint expression being performed for each of the one or more sensors, the error model representing correspondence between
a number of second present objects in a first observation range of the sensor represented by the observation value variable of the observation value and an error term related to an assumed detection error range of the sensor, and
a number of third present objects in a second observation range of the sensor represented by a variable indicating a number of fourth present objects in an observation unit space determined based on the second observation range of the sensor and a range each of the one or more areas;
calculating a possible range of a number of fifth present objects in each of the one or more areas by using the constraint expression; and
calculating, by using the possible range, reliability of an estimation value of the number of the fifth present objects for each of the one or more areas without using the estimation value.

17. A computer program product comprising a non-transitory computer-readable recording medium on which a program executable by a computer is recorded, the program instructing the computer to:
derive a constraint expression obtained by substituting an observation value for a term of an observation value variable included in an error model, the observation value being an observation value of a number of first present objects observed by one or more sensors disposed in at least part of one or more areas, deriving of the constraint expression being performed for each of the one or more sensors, the error model representing correspondence between
a number of second present objects in a first observation range of the sensor represented by the observation value variable of the observation value and an error term related to an assumed detection error range of the sensor, and
a number of third present objects in a second observation range of the sensor represented by a variable indicating a number of fourth present objects in an observation unit space determined based on the second observation range of the sensor and a range of each of the one or more areas;
calculate a possible range of a number of fifth present objects in each of the one or more areas by using the constraint expression; and
calculate, by using the possible range, reliability of an estimation value of the number of the fifth present objects for each of the one or more areas without using the estimation value.

18. An information processing system comprising:
one or more sensors disposed in at least part of one or more areas; and
one or more hardware processors configured to function as
a derivation unit to derive, for each of the one or more sensors, a constraint expression obtained by substituting an observation value for a term of an observation value variable included in an error model, the observation value being an observation value of a number of first present objects observed by the one or more sensors, the error model representing correspondence between
a number of second present objects in a first observation range of the sensor represented by the observation value variable of the observation value and an error term related to an assumed detection error range of the sensor, and
a number of third present objects in a second observation range of the sensor represented by a variable indicating a number of fourth present objects in an observation unit space determined based on the second observation range of the sensor and a range of each of the one or more areas,
a range calculation unit to calculate a possible range of a number of fifth present objects in each of the one or more areas by using the constraint expression, and
a reliability calculation unit to calculate, by using the possible range, reliability of an estimation value of the number of the fifth present objects for each of the one or more areas without using the estimation value.

* * * * *

UNITED STATES PATENT AND TRADEMARK OFFICE
CERTIFICATE OF CORRECTION

PATENT NO. : 12,174,690 B2  
APPLICATION NO. : 17/822920  
DATED : December 24, 2024  
INVENTOR(S) : Fukushima et al.

Page 1 of 1

It is certified that error appears in the above-identified patent and that said Letters Patent is hereby corrected as shown below:

In the Claims

In Claim 11, Column 38, Lines 35-36, "according to claim 4" should read --according to claim 10--.

Signed and Sealed this  
Twenty-fifth Day of March, 2025

Coke Morgan Stewart  
*Acting Director of the United States Patent and Trademark Office*